(12) United States Patent
Li

(10) Patent No.: US 10,579,701 B2
(45) Date of Patent: Mar. 3, 2020

(54) LEGAL CHIP IDENTIFICATION METHOD AND SYSTEM

(71) Applicant: TENDYRON CORPORATION, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 16/480,189

(22) PCT Filed: Jan. 4, 2018

(86) PCT No.: PCT/CN2018/071336
§ 371 (c)(1),
(2) Date: Jul. 23, 2019

(87) PCT Pub. No.: WO2018/137482
PCT Pub. Date: Aug. 2, 2018

(65) Prior Publication Data
US 2019/0384936 A1 Dec. 19, 2019

(30) Foreign Application Priority Data

Jan. 25, 2017 (CN) .......................... 2017 1 0060672
Jan. 25, 2017 (CN) .......................... 2017 1 0060676
Jan. 25, 2017 (CN) .......................... 2017 1 0060677

(51) Int. Cl.
*G06F 17/00* (2019.01)
*G06F 21/72* (2013.01)
(Continued)

(52) U.S. Cl.
CPC .............. *G06F 17/00* (2013.01); *G06F 21/72* (2013.01); *G06K 17/0022* (2013.01);
(Continued)

(58) Field of Classification Search
CPC ....... G06F 17/00; G06F 21/72; G06K 19/077; G06K 17/0022; H01L 22/20; H01L 2223/54433
See application file for complete search history.

(56) References Cited

U.S. PATENT DOCUMENTS

| 8,639,625 B1* | 1/2014 | Ginter | G06F 21/10 705/50 |
| 2012/0102334 A1* | 4/2012 | O'Loughlin | G06F 21/57 713/189 |
| 2016/0314320 A1* | 10/2016 | Lee | G06F 21/86 |

FOREIGN PATENT DOCUMENTS

| CN | 103440451 A | 11/2013 |
| CN | 105138870 A | 12/2015 |

(Continued)

OTHER PUBLICATIONS

International Search Report dated Apr. 4, 2018 for PCT/CN2018/071336.
ISA Written Opinion dated Apr. 4, 2018 for PCT/CN2018/071336.

*Primary Examiner* — Ajay Ojha
(74) *Attorney, Agent, or Firm* — Martin & Ferraro, LLP

(57) ABSTRACT

Provided are method and system for identifying a legal chip. The method includes a reading device sequentially sending, to a chip to be read, M instructions to be processed comprising N preset instructions (S101); the chip to be read sequentially receiving the M instructions to be processed, and responding to each instruction to be processed (S102); the reading device acquiring a set of first processing durations (S103) the reading device acquiring a processing duration characteristic of the chip to be read (S104); and the reading device acquiring a result of comparing the processing duration characteristic of the chip to be read with a processing duration characteristic of a legal chip corre- (Continued)

sponding to an identifier of the chip to be read, and determining the chip to be read as a legal chip (S105).

20 Claims, 5 Drawing Sheets

(51) Int. Cl.
*G06K 19/077* (2006.01)
*H01L 21/66* (2006.01)
*G06K 17/00* (2006.01)
(52) U.S. Cl.
CPC ............ *G06K 19/077* (2013.01); *H01L 22/20* (2013.01); *H01L 2223/54433* (2013.01)

(56) References Cited

FOREIGN PATENT DOCUMENTS

| | | | |
|---|---|---|---|
| CN | 107358127 | A | 11/2017 |
| CN | 107358128 | A | 11/2017 |
| CN | 107369022 | A | 11/2017 |

* cited by examiner

LEGAL CHIP IDENTIFICATION METHOD AND SYSTEM

CROSS-REFERENCE TO RELATED APPLICATION

This application is a U.S national phase application of International Application No. PCT/CN2018/071336, filed on Jan. 4, 2018, which claims priority to Chinese Patent Application No. 201710060677.8, filed by TENDYRON corporation on Jan. 25, 2017, titled with "legal chip identification method and system", Chinese Patent Application No. 201710060676.3, filed by TENDYRON corporation on Jan. 25, 2017, titled with "legal chip identification method and system", and Chinese Patent Application No. 201710060672.5, filed by TENDYRON corporation on Jan. 25, 2017, titled with "legal chip identification method and system", the entire contents of which are incorporated herein by reference.

TECHNICAL FIELD

The present disclosure relates to a field of electronic technology, and particular to method and system for identifying a legal chip.

BACKGROUND

At present, a device to be read provided with a built-in chip has been increasingly used in fields involving property security and identity authentication, such as in a smart card and an ID card. The built-in chip in the device to be read typically stores data, such as identity and property data of a user, which requires a higher level of security in protecting the data of the built-in chip.

For keeping data safe, existing technologies are used to prevent a chip from being illegally copied, but only to a certain extent, not completely. For example, criminals may illegally acquire information such as security data of the user and identifier of the chip stored in the chip built in the device to be read, for example by a leak from the chip manufacturer or cracking encrypt algorithms, and further store the data acquired illegally into a chip of a forged device to be read, such that the forged device is able to provide the security data of the user and the identifier of the chip which is the same as the legal device to be read. In this case, the reading device may determine that the forged device is a legal device and perform corresponding operations, thus endangering the identity and property security of the user.

SUMMARY

The present disclosure aims at solving at least one of the above problems.

An object of the present disclosure is to provide a method for identifying a legal chip.

Another object of the present disclosure is to provide a system for identifying a legal chip.

In order to achieve the above objects, technical solutions of the present disclosure are realized as follows.

According to embodiments of a first aspect of the present disclosure, a method for identifying a legal chip is provided, including: a reading device sequentially sending, to a chip to be read, M instructions to be processed including N preset instructions, where M≥N and M and N are both positive integers; the chip to be read sequentially receiving the M instructions to be processed, and responding to each instruction to be processed; the reading device acquiring a set of first processing durations in which the chip to be read responds to the N preset instructions, respectively; the reading device acquiring a processing duration characteristic of the chip to be read by performing a first process on the set of first processing durations; and the reading device acquiring a result of comparing the processing duration characteristic of the chip to be read with a processing duration characteristic of a legal chip corresponding to an identifier of the chip to be read, and determining the chip to be read as a legal chip if the processing duration characteristic of the chip to be read is in accordance with the processing duration characteristic of the legal chip.

According to embodiments of a second aspect of the present disclosure, a system for identifying a legal chip is provided, including: a reading device and a chip to be read, in which the reading device is configured to sequentially send, to the chip to be read, M instructions to be processed including N preset instructions, where M≥N and M and N are both positive integers; the chip to be read is configured to sequentially receive the M instructions to be processed, and respond to each instruction to be processed; the reading device is further configured to acquire a set of first processing durations in which the chip to be read responds to the N preset instructions, respectively; the reading device is further configured to acquire a processing duration characteristic of the chip to be read by performing a first process on the set of first processing durations; and the reading device is further configured to acquire a result of comparing the processing duration characteristic of the chip to be read with a processing duration characteristic of a legal chip corresponding to an identifier of the chip to be read, and determine that the chip to be read is a legal chip if the processing duration characteristic of the chip to be read is in accordance with the processing duration characteristic of the legal chip.

According to embodiments of a third aspect of the present disclosure, a method for identifying a legal chip is provided, including: a reading device sequentially sending, to a chip to be read, M instructions to be processed including N preset instructions, where M≥N and M and N are both positive integers; the chip to be read sequentially receiving the M instructions to be processed, and responding to each instruction to be processed; the reading device acquiring a first factor set, in which the first factor set includes level features of response information which the chip to be read responds to the N preset instructions respectively, and each of the level features of the response information includes at least one selected from the group consisting of a level value, a duration of a rising edge of a level, a pulse width, a duty ratio, a status value, and a time point where a differential signal intersection is; the reading device acquiring a level characteristic of the chip to be read by performing a first process on the first factor set; and the reading device acquiring a result of comparing the level characteristic of the chip to be read with a level characteristic of a legal chip corresponding to an identifier of the chip to be read, and determining the chip to be read as a legal chip if the level characteristic of the chip to be read is in accordance with the level characteristic of the legal chip.

DETAILED DESCRIPTION

Embodiment 1

Figure 1:
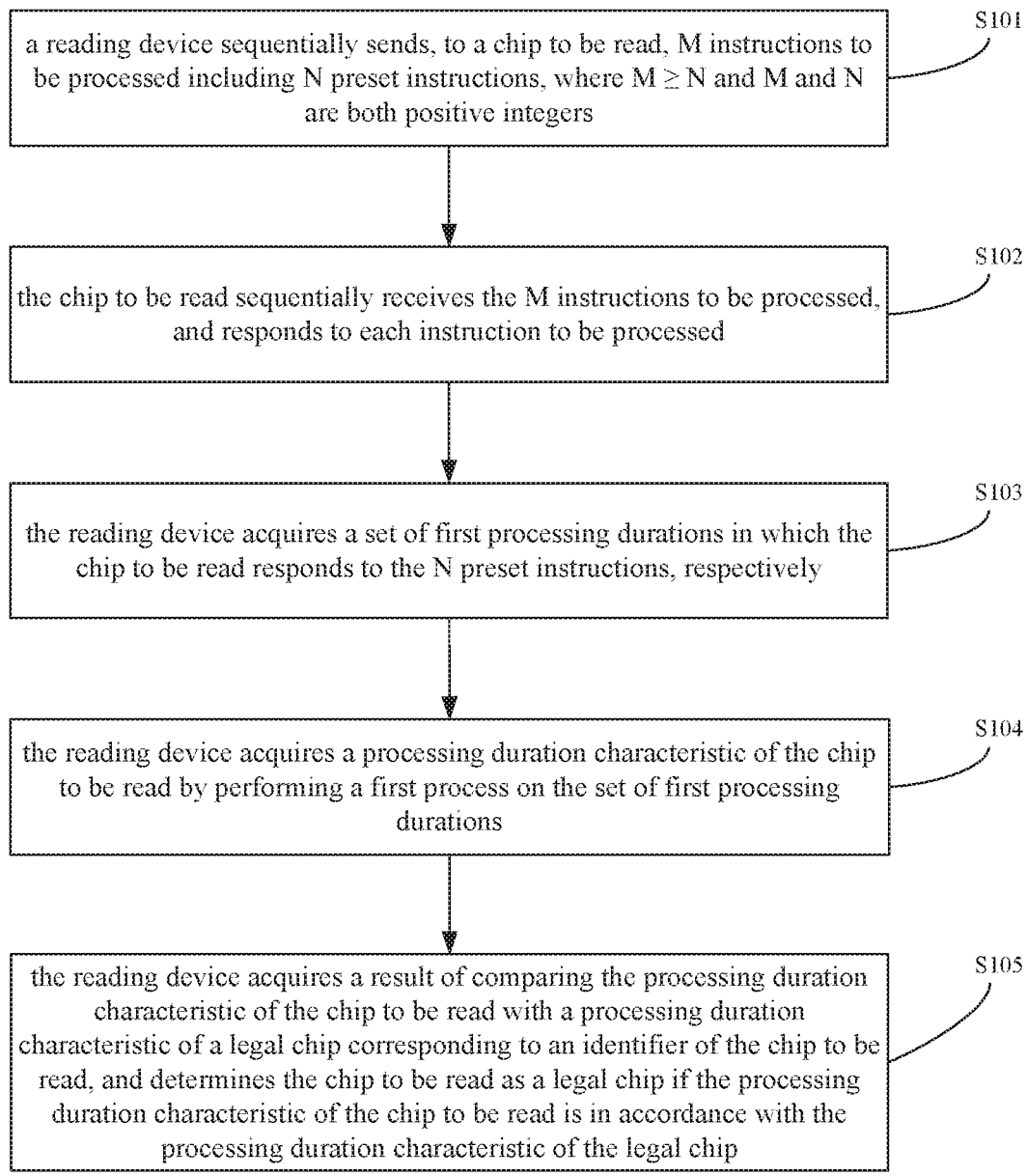
FIG. 1 is a flow chart of a legal chip identification method provided by Embodiment 1 of the present disclosure.

In this embodiment of the present disclosure, a legal chip identification method is provided. FIG. 1 is a flow chart of a legal chip identification method provided in this embodiment. As shown in FIG. 1, the method includes following steps (S101 to S105).

In S101, a reading device sequentially sends, to a chip to be read, M instructions to be processed including N preset instructions, where M≥N and M and N are both positive integers.

In this embodiment, the reading device may be any one of a POS machine, an ATM machine, a mobile phone with an NFC function, a bus card reader, a stored value card reader, a combination of a mobile phone and a card reader and a combination of a PC and a card reader. The chip to be read is disposed in a device to be read, and the device to be read may be any one of a second-generation resident ID card, a bus card, a smart card with a chip, a smart card with a chip and a magnetic strip and an electronic wallet. The device to be read is coupled to the reading device in a contact manner or a non-contact manner, where the contact manner may indicate that the device to be read is inserted into a preset slot of the reading device, and the non-contact manner may include, but is not limited to, NFC and Bluetooth.

In S101, when the device to be read accesses the reading device in a contact manner or a non-contact manner, the reading device sequentially sends M instructions to be processed to the chip to be read which is built in the device to be read. Alternatively, once one instruction to be processed is sent by the reading device, the reading device waits to receive response information which the chip to be read responds to this current instruction. The reading device will proceed and send a next instruction to be processed only after receiving the response information which the chip to be read responds to the current instruction to be processed. Alternatively, the reading device may wait to receive the response information which the chip to be read responses to the M instructions to be processed respectively after the M instructions to be processed are sequentially sent. Alternatively, the reading device may sequentially send the instructions to be processed to the chip to be read, and receive the response information which the chip to be read responds to the received instructions to be processed at the same time.

In S102, the chip to be read sequentially receives the M instructions to be processed, and responds to each instruction to be processed.

In S102, once the chip to be read receives one instruction to be processed, it responds to the received instruction to be processed, feeds the response information responded to the current instruction to be processed back to the reading device, and waits to receive a next instruction to be processed, which will be sent by the reading device. Alternatively, the chip to be read may start the operation of sequentially responding to the M instructions to be processed after the M instructions to be processed are sequentially received. Alternatively, the chip to be read may sequentially receive the M instructions to be processed which are sent by the reading device, and in the meantime respond to the received instructions to be processed and feed the response information back to the reading device to respond to the received instructions to be processed.

In S103, the reading device acquires a set of first processing durations in which the chip to be read responds to the N preset instructions, respectively.

In S103, the reading device and the device to be read are coupled in a contact manner or a non-contact manner. When the contact manner is used, a signal is transmitted between the reading device and the device to be read via current, and when the non-contact manner is used, the reading device is generally not far from the device to be read and electromagnetic wave propagates in the air at the speed of light. Therefore, the signal transmission duration between the reading device and the chip to be read is very short and can be neglected, and a duration from the time the reading device sends the preset instruction to the time the reading device receives the response information which the chip to be read responds to the preset instruction may be directly used as the processing duration in which the chip to be read responds to the preset instruction. In other words, the reading device records the moment at which the reading device sends the preset instruction to the chip to be read and also records the moment at which the reading device receives the response information which the chip to be read responds to such a preset instruction, and the time difference between the two moments is regarded as the processing duration of the chip to be read in response to the preset instruction. The reading device acquires processing durations in which the chip to be read responds to the N preset instructions respectively, so as to constitute the set of first processing durations.

In S103, the reading device may acquire the set of first processing durations after receiving response information which the chip to be read responds to the $N^{th}$ preset instruction or the $M^{th}$ instruction to be processed.

In S104, the reading device acquires a processing duration characteristic of the chip to be read by performing a first process on the set of first processing durations.

In S104, the first process may be performed according to, but not limited to, any one of the following manners.

In a first manner, the reading device performs a calibrating process on processing durations in the set of first processing durations respectively, and uses calibrated processing durations as the processing duration characteristic. For example, in a calibration range available in a controllable scene, the reading device performs a calibrating process of rectifying a deviation on processing durations in the set of first processing durations respectively.

In a second manner, the reading device stores each processing duration in the set of first processing durations, and uses the stored processing durations as the processing duration characteristic.

In a third manner, the reading device performs a categorizing process on processing durations in the set of first processing durations respectively. For example, the preset instruction includes a card reading instruction, a signature instruction and an encryption instruction. On this basis, processing durations in which the chip to be read responds to the signature instruction and processing durations in which the chip to be read responds to the encryption instruction are classified in one group and processing durations in which the chip to be read responds to the card reading instruction are classified in another group.

Alternatively, the first process may also be a combination of any two or three of the foregoing three process manners, which is not specifically limited in this embodiment.

In S105, the reading device acquires a result of comparing the processing duration characteristic of the chip to be read with a processing duration characteristic of a legal chip corresponding to an identifier of the chip to be read, and determines the chip to be read as a legal chip if the processing duration characteristic of the chip to be read is in accordance with the processing duration characteristic of the legal chip.

In this embodiment, the identifier of the chip to be read may be unique identification information of the chip to be read, such as information of a serial number, a production number, a production date and the like.

Figure 2:
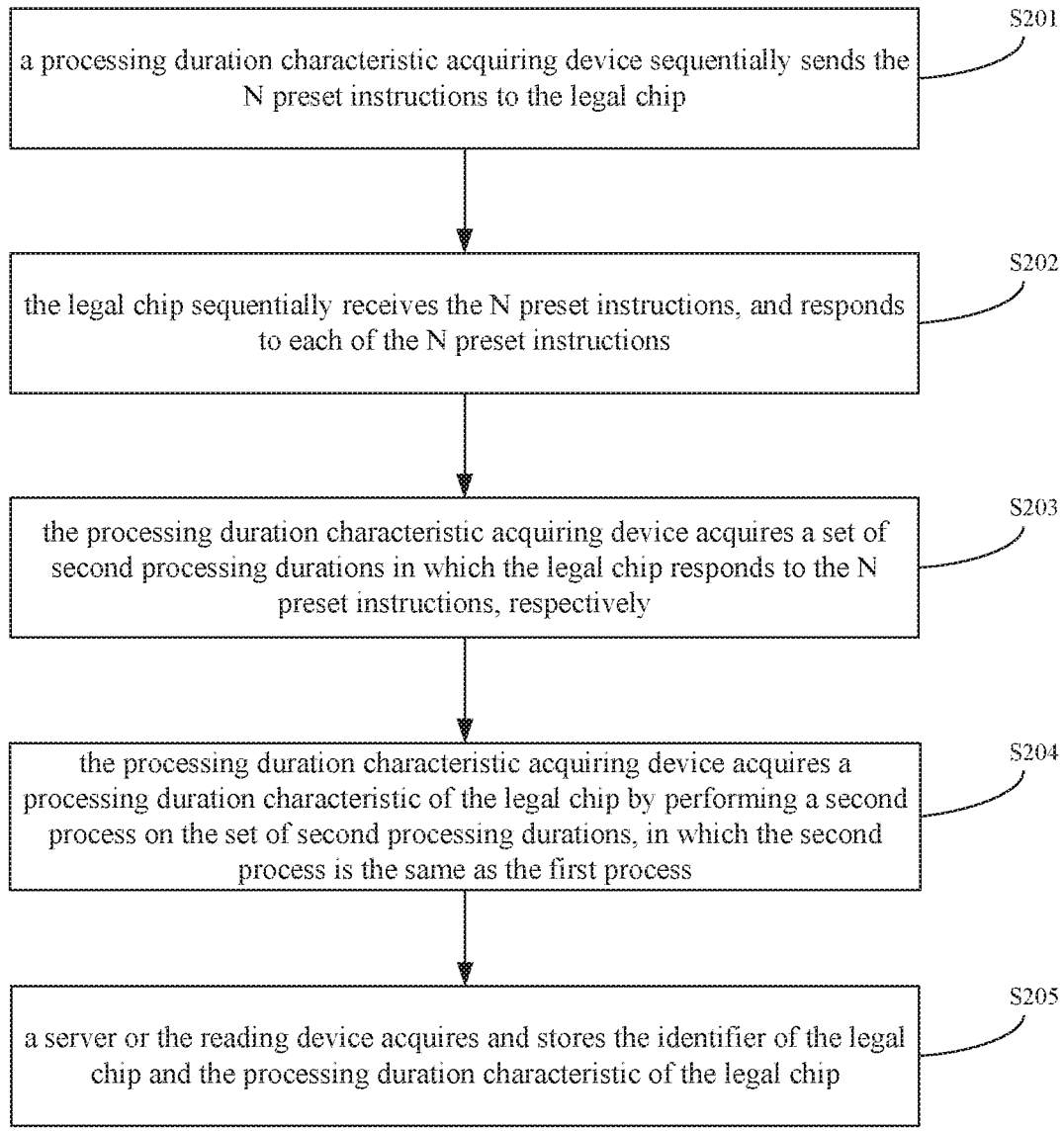
FIG. 2 is a flow chart of acquiring processing duration characteristic of a legal chip in the legal chip identification method provided by Embodiment 1 of the present disclosure.

In an alternative embodiment of the present disclosure, before the reading device acquires the result of comparing the processing duration characteristic of the chip to be read with the processing duration characteristic of the legal chip corresponding to the identifier of the chip to be read, a processing duration characteristic of the legal chip corresponding to the identifier of the chip to be read should be acquired, and thus as shown in FIG. 2, the method further includes following steps (S201 to S205).

In S201, a processing duration characteristic acquiring device sequentially sends the N preset instructions to the legal chip.

In an alternative embodiment of the present disclosure, the processing duration characteristic acquiring device may be the reading device, such that the reading device itself acquires the processing duration characteristic of the legal chip corresponding to the identifier of the chip to be read. Alternatively, the processing duration characteristic acquiring device may be an additional piece integrated with the reading device, for example an external member of a POS machine or a card reader and a protective containment of a mobile phone. In the process of the reading device determining whether the chip to be read is a legal chip, the processing duration characteristic acquiring device can be used as a data transceiving module of the reading device, and the reading device sends an instruction to the chip to be read and receives the response information fed back from the chip to be read via the processing duration characteristic acquiring device. Alternatively, the processing duration characteristic acquiring device may be an external monitoring device independent of the reading device for monitoring the processing duration characteristics of the legal chip.

In S201, when the device to be read with a built-in legal chip accesses the reading device in a contact manner or a non-contact manner, the processing duration characteristic acquiring device sequentially sends N preset instructions to the legal chip built in the device to be read. Alternatively, once one preset instruction is sent by the processing duration characteristic acquiring device, the processing duration characteristic acquiring device waits to receive response information which the legal chip responds to this preset instruction. The processing duration characteristic acquiring device will proceed and send a next preset instruction to the legal chip only after receiving the response information which the legal chip responds to the current preset instruction. Alternatively, the processing duration characteristic acquiring device may wait to receive the response information which the legal chip responses to the N preset instructions respectively after the N preset instructions are sequentially sent. Alternatively, the processing duration characteristic acquiring device may sequentially send the N preset instructions to the legal chip, and receive the response information which the legal chip responds to the received preset instructions at the same time.

In S201, the N preset instructions sent from the processing duration characteristic acquiring device to the legal chip are the same as the N preset instructions sent from the reading device to the chip to be read.

In S202, the legal chip sequentially receives the N preset instructions, and responds to each of the N preset instructions.

In S202, once the legal chip receives one preset instruction, it responds to the received preset instruction, feeds the response information responded to the current preset instruction back to the processing duration characteristic acquiring device, and waits to receive a next preset instruction, which will be sent by the processing duration characteristic acquiring device. Alternatively, the legal chip may start the operation of sequentially responding to the N preset instructions after the N preset instructions are sequentially received. Alternatively, the legal chip may sequentially receive the N preset instructions which are sent by the processing duration characteristic acquiring device, and in the meantime respond to the received preset instructions and feed the response information back to the processing duration characteristic acquiring device to respond to the received preset instructions.

In S203, the processing duration characteristic acquiring device acquires a set of second processing durations in which the legal chip responds to the N preset instructions, respectively.

In S203, the processing duration characteristic acquiring device and the device to be read are coupled in a contact manner or a non-contact manner. When the contact manner is used, a signal is transmitted between the processing duration characteristic acquiring device and the device to be read via current, and when the non-contact manner is used, the processing duration characteristic acquiring device is generally not far from the device to be read and electromagnetic wave propagates in the air at the speed of light. Therefore, the signal transmission duration between the processing duration characteristic acquiring device and the legal chip is very short and can be neglected, and a duration from the time the processing duration characteristic acquiring device sends the preset instruction to the time the processing duration characteristic acquiring device receives the response information which the legal chip responds to the preset instruction may be directly used as the processing duration in which the legal chip responds to the preset instruction. In other words, the processing duration characteristic acquiring device records the moment at which the processing duration characteristic acquiring device sends the preset instruction to the legal chip and also records the moment at which the processing duration characteristic acquiring device receives the response information which the legal chip responds to such a preset instruction, and the time difference between the two moments is regarded as the processing duration of the legal chip in response to the preset instruction. The processing duration characteristic acquiring device acquires processing durations in which the legal chip responds to the N preset instructions respectively, so as to constitute the set of second processing durations.

In S204, the processing duration characteristic acquiring device acquires a processing duration characteristic of the legal chip by performing a second process on the set of second processing durations, in which the second process is the same as the first process.

In S204, the second process may be performed according to, but not limited to, any one of the following manners.

In a first manner, the processing duration characteristic acquiring device performs a calibrating process on processing durations in the set of second processing durations respectively, and uses calibrated processing durations as the processing duration characteristic. For example, in a calibration range available in a controllable scene, the processing duration characteristic acquiring device performs a calibrating process of rectifying a deviation on processing durations in the set of second processing durations respectively.

In a second manner, the processing duration characteristic acquiring device stores each processing duration in the set of second processing durations, and uses the stored processing durations as the processing duration characteristic.

In a third manner, the processing duration characteristic acquiring device performs a categorizing process on processing durations in the set of second processing durations respectively. For example, the preset instruction includes a card reading instruction, a signature instruction and an encryption instruction. On this basis, processing durations in which the legal chip responds to the signature instruction and processing durations in which the legal chip responds to the encryption instruction are classified in one group and processing durations in which the legal chip responds to the card reading instruction are classified in another group.

Alternatively, the second process may also be a combination of any two or three of the foregoing three process manners, which is not specifically limited in this embodiment.

In S205, a server or the reading device acquires and stores the identifier of the legal chip and the processing duration characteristic of the legal chip.

In S205, the server may be set in the background, and may communicate with the processing duration characteristic acquiring device through a wired network or a wireless network. The wired network may be a private wire network or the internet, and the wireless network may be a 3G network, a 4G network or a WIFI network. When the processing duration characteristic acquiring device is an external monitoring device independent of the reading device, the reading device may communicate with the processing duration characteristic acquiring device through a wired network or a wireless network. Specifically, the wired network may be a private wire network or the internet, and the wireless network may be a 3G network, a 4G network or a WIFI network The above steps i.e., S201 to S205 may be performed during the legal chip factory test. Therefore, the processing duration characteristic acquiring device pre-stores the processing duration characteristic of the legal chip in the server or the reading device. When the legitimacy of the chip to be read needs to be identified, the processing duration characteristic of the legal chip may be acquired directly from the server or the reading device.

In an alternative embodiment, the processing duration characteristic acquiring device may acquire processing duration characteristics of a plurality of legal chips. The server or the reading device may acquire the processing duration characteristics of a plurality of legal chips from one processing duration characteristic acquiring device or from a plurality of processing duration characteristic acquiring devices, and store the identifier and the processing duration characteristic of each of the legal chips.

In an alternative embodiment, in case the identifier and the processing duration characteristic of the legal chip are not previously stored in the server or in the reading device, which may cause the comparison of the processing duration characteristic of the chip to be read with the processing duration characteristic of the legal chip corresponding to the identifier of the chip to be read cannot be performed, the server or the reading device may send an update request to the processing duration characteristic acquiring device in a wired manner or in a wireless manner, and the processing duration characteristic acquiring device responds to the update request. In such a way, the identifier and the processing duration characteristic of the legal chip stored in the server or in the reading device may be updated, thus improving the accuracy of the comparison of the processing duration characteristic of the chip to be read with the processing duration characteristic of the legal chip corresponding to the identifier of the chip to be read.

In this alternative embodiment, if N≥2, in the process of determining whether the processing duration characteristic of the chip to be read is in accordance with the processing duration characteristic of the legal chip corresponding to the identifier of the chip to be read, it is necessary to compare the processing duration of the chip to be read with the processing duration of the legal chip, both responding to the same preset instruction, thereby acquiring N comparison results. If the number of accordance results in the N comparison results exceeds a preset threshold, it indicates that the processing duration characteristic of the chip to be read is in accordance with the processing duration characteristic of the legal chip corresponding to the identifier of the chip to be read, otherwise the processing duration characteristic of the chip to be read is not in accordance with the processing duration characteristic of the legal chip corresponding to the identifier of the chip to be read. For example, the preset instruction includes instruction 1, instruction 2 and instruction 3. In the process of determining whether the processing duration characteristic of the chip to be read is in accordance with the processing duration characteristic of the legal chip corresponding to the identifier of the chip to be read, a processing duration characteristic of the chip to be read responding to the instruction 1 is compared with a processing duration characteristic of the legal chip responding to the instruction 1, thereby acquiring a comparison result 1; a processing duration characteristic of the chip to be read responding to the instruction 2 is compared with a processing duration characteristic of the legal chip responding to the instruction 2, thereby acquiring a comparison result 2, and a processing duration characteristic of the chip to be read responding to the instruction 3 is compared with a processing duration characteristic of the legal chip responding to the instruction 3, thereby acquiring a comparison result 3. Specifically, the accordance result means that the processing duration of the chip to be read is the same as the processing duration of the legal chip or a difference between the two is in a certain error range. When the above three comparison results are all accordance results or more than half of the comparison results are accordance results, it is determined that the processing duration characteristic of the chip to be read is in accordance with the processing duration characteristic of the legal chip corresponding to the identifier of the chip to be read. Alternatively, only when the above three comparison results are all accordance results, it is determined that the processing duration characteristic of the chip to be read is in accordance with the processing duration characteristic of the legal chip corresponding to the identifier of the chip to be read.

In an alternative embodiment, the reading device acquires the result of comparing the processing duration characteristic of the chip to be read with the processing duration characteristic of the legal chip corresponding to the identifier of the chip to be read, and determines the chip to be read as a legal chip if the processing duration characteristic of the chip to be read is in accordance with the processing duration characteristic of the legal chip in any one of following three manners which shall not be construed to limit the present disclosure.

In a first manner, the reading device sends the identifier of the chip to be read and the processing duration characteristic of the chip to be read to a server, the server receives the identifier of the chip to be read and the processing duration characteristic of the chip to be read, acquires a pre-stored processing duration characteristic of the legal chip corresponding to the identifier of the chip to be read, compares the processing duration characteristic of the chip to be read with the processing duration characteristic of the legal chip, and sends the result of the processing duration characteristic of the chip to be read being in accordance with the processing duration characteristic of the legal chip to the reading device; and the reading device determines that the chip to be read is a legal chip.

Alternatively, if the server compares the processing duration characteristic of the chip to be read with the processing duration characteristic of the legal chip and the processing duration characteristic of the chip to be read is not in accordance with the processing duration characteristic of the legal chip, the server may store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the processing duration characteristic of the chip to be read and comparing the processing duration characteristic of the chip to be read with the processing duration characteristic of the legal chip corresponding to the identifier of the chip to be read, thus quickly identifying whether the chip to be read is legal.

In a second manner, the reading device acquires a pre-stored processing duration characteristic of the legal chip corresponding to the identifier of the chip to be read, compares the processing duration characteristic of the chip to be read with the processing duration characteristic of the legal chip, and determines the chip to be read as a legal chip if the processing duration characteristic of the chip to be read is in accordance with the processing duration characteristic of the legal chip.

Alternatively, if the reading device compares the processing duration characteristic of the chip to be read with the processing duration characteristic of the legal chip and the processing duration characteristic of the chip to be read is not in accordance with the processing duration characteristic of the legal chip, the reading device may store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the processing duration characteristic of the chip to be read and comparing the processing duration characteristic of the chip to be read with the processing duration characteristic of the legal chip corresponding to the identifier of the chip to be read, thus quickly identifying whether the chip to be read is legal.

In a third manner, the reading device sends the identifier of the chip to be read to a server, the server receives the identifier of the chip to be read, acquires a pre-stored processing duration characteristic of the legal chip corresponding to the identifier of the chip to be read, and sends the processing duration characteristic of the legal chip corresponding to the identifier of the chip to be read to the reading device; and the reading device compares the processing duration characteristic of the chip to be read with the processing duration characteristic of the legal chip, and determines the chip to be read as a legal chip if the processing duration characteristic of the chip to be read is in accordance with the processing duration characteristic of the legal chip.

Alternatively, if the reading device compares the processing duration characteristic of the chip to be read with the processing duration characteristic of the legal chip and the processing duration characteristic of the chip to be read is not in accordance with the processing duration characteristic of the legal chip, the reading device may inform the server to store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the processing duration characteristic of the chip to be read and comparing the processing duration characteristic of the chip to be read with the processing duration characteristic of the legal chip corresponding to the identifier of the chip to be read, thus quickly identifying whether the chip to be read is legal.

In an alternative embodiment, the step of acquiring the pre-stored processing duration characteristic of the legal chip corresponding to the identifier of the chip to be read includes: comparing the identifier of the chip to be read with the identifier of the legal chip; and acquiring the processing duration characteristic of the legal chip if the identifier of the chip to be read is determined to be in accordance with the identifier of the legal chip.

Alternatively, if the device to be read with the built-in legal chip can access the reading device in a contact manner and a non-contact manner, for a same preset instruction sent by the reading device, a processing duration in which the legal chip responds to such a preset instruction received in the contact manner may be the same as or different from a processing duration in which the legal chip responds to the same preset instruction received in the non-contact manner, which depends on the design of the chip. When the processing duration in which the legal chip responds to the preset instruction received in the contact manner is different from the processing duration in which the legal chip responds to the same preset instruction received in the non-contact manner, a processing duration characteristic of the legal chip in the contact manner is different from a processing duration characteristic of the legal chip in the non-contact manner. On this basis, in order to accurately identify whether the chip to be read is a legal chip, the device to be read with the built-in legal chip needs to access the processing duration characteristic acquiring device in the contact manner and in the non-contact manner, respectively, and then the above steps i.e., S201 to S204, are performed for each manner, such that the processing duration characteristic acquiring device may acquire the processing duration characteristics of the legal chip in both the contact manner and the non-contact manner. Therefore, after determining that the processing duration characteristic of the legal chip corresponding to the identifier of the chip to be read is in accordance, it is necessary to acquire the processing duration characteristic of the legal chip corresponding to the identifier of the chip to be read according to a connection manner between the device to be read with the built-in chip and the reading device. In other words, if the connection manner between the reading device and the device to be read with the built-in chip to be read is the non-contact manner, the reading device acquires the processing duration characteristic of the legal chip corresponding to the identifier of the chip to be read in the non-contact manner, and if the connection manner between the reading device and the device to be read with the built-in chip to be read is the contact manner, the reading device acquires the processing duration characteristic of the legal chip corresponding to the identifier of the chip to be read in the contact manner.

In this embodiment, if the processing duration characteristic of the chip to be read is not in accordance with the processing duration characteristic of the legal chip corresponding to the identifier of the chip to be read, it indicates that the chip to be read is not a legal chip, and there will be a risk if a further operation is performed between the reading device and the chip to be read. Therefore, the reading device may generate prompt information and output the prompt information by means of voice broadcast, text display, light flashing, etc., for reminding the holder of reading device that the chip to be read is not a legal chip or there is a risk in the device to be read, or the reading device may send alarm information to the user of the device to be read with the built-in legal chip, for example, the reading device sends an alarm message, an alarm email and the like via a server to a mobile phone of the user of the device to be read with the built-in legal chip.

With the legal chip identification method according to embodiments of the present disclosure, on the basis of the fact that there may be difference in the processing durations in which different chips respond to the instruction sent by the reading device, after the identifier of the chip to be read is acquired, the processing duration characteristic of the chip to be read is compared with the processing duration characteristic of the legal chip corresponding to the identifier of the chip to be read, and the chip to be read is determined as a legal chip if the processing duration characteristic of the chip to be read is in accordance with the processing duration characteristic of the legal chip. Therefore, even if a forged device to be read has a chip storing an identifier of a legal chip which is stolen and copied from the legal chip, it is possible to identify the legitimacy of the chip to be read according to the result of comparing the processing duration characteristic of the chip to be read and the processing duration characteristic of the legal chip having an identifier corresponding to the chip to be read, such that it may be effectively determined whether the device to be read with such a built-in chip to be read is legal, thus improving the accuracy of identifying the legitimacy of the device to be read by the reading device.

Embodiment 2

Figure 3:
FIG. 3 is a schematic diagram of a legal chip identification system provided by Embodiment 2 of the present disclosure.

In this embodiment of the present disclosure, a legal chip identification system is provided and realized by the legal chip identification method provided in Embodiment 1. FIG. 3 is a schematic diagram of a legal chip identification system provided in this embodiment of the present disclosure. As shown in FIG. 3, the system includes a reading device 301 and a chip 302 to be read. Specifically, the reading device 301 is configured to sequentially send, to the chip 302 to be read, M instructions to be processed including N preset instructions, where M≥N and M and N are both positive integers; the chip 302 to be read is configured to sequentially receive the M instructions to be processed, and respond to each instruction to be processed; the reading device 301 is further configured to acquire a set of first processing durations in which the chip 302 to be read responds to the N preset instructions, respectively; the reading device 301 is further configured to acquire a processing duration characteristic of the chip 302 to be read by performing a first process on the set of first processing durations; and the reading device 301 is further configured to acquire a result of comparing the processing duration characteristic of the chip 302 to be read with a processing duration characteristic of a legal chip 304 corresponding to an identifier of the chip to be read, and determine that the chip to be read is a legal chip 304 if the processing duration characteristic of the chip to be read is in accordance with the processing duration characteristic of the legal chip.

In this embodiment, the reading device 301 and the device to be read are coupled in a contact manner or a non-contact manner. When the contact manner is used, a signal is transmitted between the reading device 301 and the device to be read via current, and when the non-contact manner is used, the reading device 301 is generally not far from the device to be read and electromagnetic wave propagates in the air at the speed of light. Therefore, the signal transmission duration between the reading device 301 and the chip 302 to be read is very short and can be neglected, and a duration from the time the reading device 301 sends the preset instruction to the time the reading device 301 receives the response information which the chip 302 to be read responds to the preset instruction may be directly used as the processing duration in which the chip 302 to be read responds to the preset instruction. In other words, the reading device 301 records the moment at which the reading device 301 sends the preset instruction to the chip 302 to be read and also records the moment at which the reading device 301 receives the response information which the chip 302 to be read responds to such a preset instruction, and the time difference between the two moments is regarded as the processing duration of the chip 302 to be read in response to the preset instruction. The reading device 301 acquires processing durations in which the chip 302 to be read responds to the N preset instructions respectively, so as to constitute the set of first processing durations.

In this embodiment, the reading device 301 may acquire the set of first processing durations after receiving response information which the chip 302 to be read responds to the N preset instruction or the $M^{th}$ instruction to be processed.

In this embodiment, the first process may include categorizing, storing, and/or calibrating.

Figure 4:
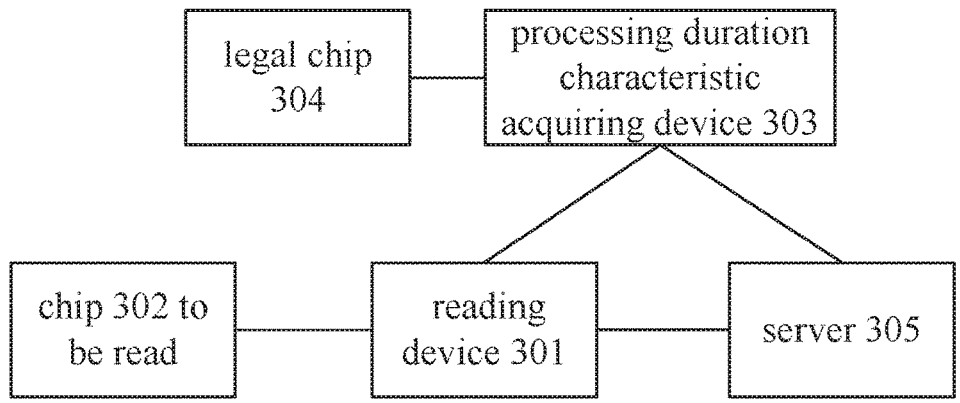
FIG. 4 is a schematic diagram of a legal chip identification system provided by Embodiment 2 of the present disclosure.

In an alternative embodiment, as shown in FIG. 4, the system further includes a processing duration characteristic acquiring device 303, a legal chip 304 and optionally a server 305. Specifically, before the reading device 301 acquires the result of comparing the processing duration characteristic of the chip 302 to be read with the processing duration characteristic of the legal chip 304 corresponding to an identifier of the chip 302 to be read, the processing duration characteristic acquiring device 303 is configured to sequentially send the N preset instructions to the legal chip 304; the legal chip 304 is configured to sequentially receive the N preset instructions, and respond to each of the N preset instructions; the processing duration characteristic acquiring device 303 is further configured to acquire a set of second processing durations in which the legal chip 304 responds to the N preset instructions, respectively; the processing duration characteristic acquiring device 303 is further configured to acquire a processing duration characteristic of the legal chip 304 by performing a second process on the set of second processing durations; and the server 305 is configured to acquire and store the identifier of the legal chip 304 and the processing duration characteristic of the legal chip 304, or the reading device 301 is further configured to acquire and store the identifier of the legal chip 304 and the processing duration characteristic of the legal chip 304.

In an alternative embodiment, the N preset instructions sent from the processing duration characteristic acquiring device 303 to the legal chip 304 are the same as the N preset instructions sent from the reading device 301 to the chip 302 to be read.

In an alternative embodiment, the second process may include categorizing, storing, and/or calibrating.

In an alternative embodiment, the processing duration characteristic acquiring device 303 and the device to be read are coupled in a contact manner or a non-contact manner. When the contact manner is used, a signal is transmitted between the processing duration characteristic acquiring device 303 and the device to be read via current, and when the non-contact manner is used, the processing duration characteristic acquiring device 303 is generally not far from the device to be read and electromagnetic wave propagates in the air at the speed of light. Therefore, the signal transmission duration between the processing duration characteristic acquiring device 303 and the legal chip 304 is very short and can be neglected, and a duration from the time the processing duration characteristic acquiring device 303 sends the preset instruction to the time the processing duration characteristic acquiring device 303 receives the response information which the legal chip 304 responds to the preset instruction may be directly used as the processing duration in which the legal chip 304 responds to the preset instruction. In other words, the processing duration characteristic acquiring device 303 records the moment at which the processing duration characteristic acquiring device sends the preset instruction to the legal chip 304 and also records the moment at which the processing duration characteristic acquiring device 303 receives the response information which the legal chip 304 responds to such a preset instruction, and the time difference between the two moments is regarded as the processing duration of the legal chip 304 in response to the preset instruction. The processing duration characteristic acquiring device 303 acquires processing durations in which the legal chip 304 responds to the N preset instructions respectively, so as to constitute the set of second processing durations.

The processing duration characteristic acquiring device 303 may perform the process of acquiring the processing duration characteristic of the legal chip 304 during the factory test of the legal chip 304. Therefore, the processing duration characteristic acquiring device 303 pre-stores the processing duration characteristic of the legal chip 304 in the server 305 or the reading device 301. When the legitimacy of the chip 302 to be read needs to be identified, the processing duration characteristic of the legal chip 304 may be acquired directly from the server 305 or the reading device 301.

In this alternative embodiment, if N≥2, in the process of determining whether the processing duration characteristic of the chip 302 to be read is in accordance with the processing duration characteristic of the legal chip 304 corresponding to the identifier of the chip 302 to be read, it is necessary to compare the processing duration of the chip 302 to be read with the processing duration of the legal chip 304, both responding to the same preset instruction, thereby acquiring N comparison results. If the number of accordance results in the N comparison results exceeds a preset threshold, it indicates that the processing duration characteristic of the chip 302 to be read is in accordance with the processing duration characteristic of the legal chip 304 corresponding to the identifier of the chip 302 to be read, otherwise the processing duration characteristic of the chip 302 to be read is not in accordance with the processing duration characteristic of the legal chip 304 corresponding to the identifier of the chip 302 to be read. For example, the preset instruction includes instruction 1, instruction 2 and instruction 3. In the process of determining whether the processing duration characteristic of the chip 302 to be read is in accordance with the processing duration characteristic of the legal chip 304 corresponding to the identifier of the chip 302 to be read, a processing duration characteristic of the chip 302 to be read responding to the instruction 1 is compared with a processing duration characteristic of the legal chip 304 responding to the instruction 1, thereby acquiring a comparison result 1; a processing duration characteristic of the chip 302 to be read responding to the instruction 2 is compared with a processing duration characteristic of the legal chip 304 responding to the instruction 2, thereby acquiring a comparison result 2; and a processing duration characteristic of the chip 302 to be read responding to the instruction 3 is compared with a processing duration characteristic of the legal chip 304 responding to the instruction 3, thereby acquiring a comparison result 3. Specifically, the accordance result means that the processing duration of the chip 302 to be read is the same as the processing duration of the legal chip 304 or a difference between the two is in a certain error range. When the above three comparison results are all accordance results or more than half of the comparison results are the accordance results, it is determined that the processing duration characteristic of the chip 302 to be read is in accordance with the processing duration characteristic of the legal chip 304 corresponding to the identifier of the chip 302 to be read. Alternatively, only when the above three comparison results are all accordance results, it is determined that the processing duration characteristic of the chip 302 to be read is in accordance with the processing duration characteristic of the legal chip 304 corresponding to the identifier of the chip 302 to be read.

In an alternative embodiment, the reading device 301 acquires the result of comparing the processing duration characteristic of the chip 302 to be read with the processing duration characteristic of the legal chip 304 corresponding to the identifier of the chip 302 to be read, and determines that the chip 302 to be read is a legal chip if the processing duration characteristic of the chip 302 to be read is in accordance with the processing duration characteristic of the legal chip 304 in any one of following manners.

In a first manner, as shown in FIG. 4, the reading device 301 is further configured to send the identifier of the chip 302 to be read and the processing duration characteristic of the chip 302 to be read to a server 305; the server 305 is further configured to receive the identifier of the chip 302 to be read and the processing duration characteristic of the chip 302 to be read, acquire a pre-stored processing duration characteristic of the legal chip 304 corresponding to the identifier of the chip 302 to be read, compare the processing duration characteristic of the chip 302 to be read with the processing duration characteristic of the legal chip 304, and send the result of the processing duration characteristic of the chip 302 to be read being in accordance with the processing duration characteristic of the legal chip 304 to the reading device 301; and the reading device 301 is further configured to determine that the chip 302 to be read is a legal chip 304.

In a second manner, the reading device 301 is further configured to acquire a pre-stored processing duration characteristic of the legal chip 304 corresponding to the identifier of the chip 302 to be read, and compare the processing duration characteristic of the chip 302 to be read with the processing duration characteristic of the legal chip 304, and determine that the chip 302 to be read is a legal chip if the processing duration characteristic of the chip 302 to be read is in accordance with the processing duration characteristic of the legal chip 304.

In a third manner, as shown in FIG. 4, the reading device 301 is further configured to send the identifier of the chip 302 to be read to a server 305; the server 305 is further configured to receive the identifier of the chip 302 to be read, acquire a pre-stored processing duration characteristic of the legal chip 304 corresponding to the identifier of the chip 302 to be read, and send the processing duration characteristic of the legal chip 304 corresponding to the identifier of the chip 302 to be read to the reading device 301; and the reading device 301 is further configured to compare the processing duration characteristic of the chip 302 to be read with the processing duration characteristic of the legal chip 304, and determine that the chip 302 to be read is a legal chip if the processing duration characteristic of the chip 302 to be read is in accordance with the processing duration characteristic of the legal chip 304.

In an alternative embodiment, the reading device 301 or the server 305 acquires the pre-stored processing duration characteristic of the legal chip 304 corresponding to the identifier of the chip 302 to be read in a following manner: comparing the identifier of the chip 302 to be read with the identifier of the legal chip; acquiring the processing duration characteristic of the legal chip 304 if the identifier of the chip 302 to be read is determined to be in accordance with the identifier of the legal chip 304.

In this embodiment, if the processing duration characteristic of the chip 302 to be read is not in accordance with the processing duration characteristic of the legal chip 304 corresponding to the chip 302 to be read, it indicates that the chip 302 to be read is not a legal chip 304, and there will be a risk if a further operation is performed between the reading device 301 and the chip 302 to be read. Therefore, the reading device 301 may generate prompt information and output the prompt information by means of voice broadcast, text display, light flashing, etc., for reminding the holder of reading device 301 that the chip 302 to be read is not a legal chip 304 or there is a risk in the device to be read, or the reading device 301 may send alarm information to the user of the device to be read with the built-in legal chip, for example, the reading device 301 sends an alarm message, an alarm email and the like via a server 305 to a mobile phone of the user of the device to be read with the built-in legal chip 304.

With the legal chip identification system according to embodiments of the present disclosure, on the basis of the fact that there may be difference in the processing durations in which different chips respond to the instruction sent by the reading device 301, after the identifier of the chip 302 to be read is acquired, the processing duration characteristic of the chip 302 to be read is compared with the processing duration characteristic of the legal chip 304 corresponding to the identifier of the chip 302 to be read, and the chip 302 to be read is determined as a legal chip 304 if the processing duration characteristic of the chip 302 to be read is in accordance with the processing duration characteristic of the legal chip 304. Therefore, even if a forged device to be read has a chip storing an identifier of a legal chip 304 which is stolen and copied from the legal chip 304, it is possible to identify the legitimacy of the chip 302 to be read according to the result of comparing the processing duration characteristic of the chip 302 to be read and the processing duration characteristic of the legal chip 304 having an identifier corresponding to the chip 302 to be read, such that it may be effectively determined whether the device to be read with such a built-in chip 302 to be read is legal, thus improving the accuracy of identifying the legitimacy of the device to be read by the reading device 301.

Embodiment 3

Figure 5:
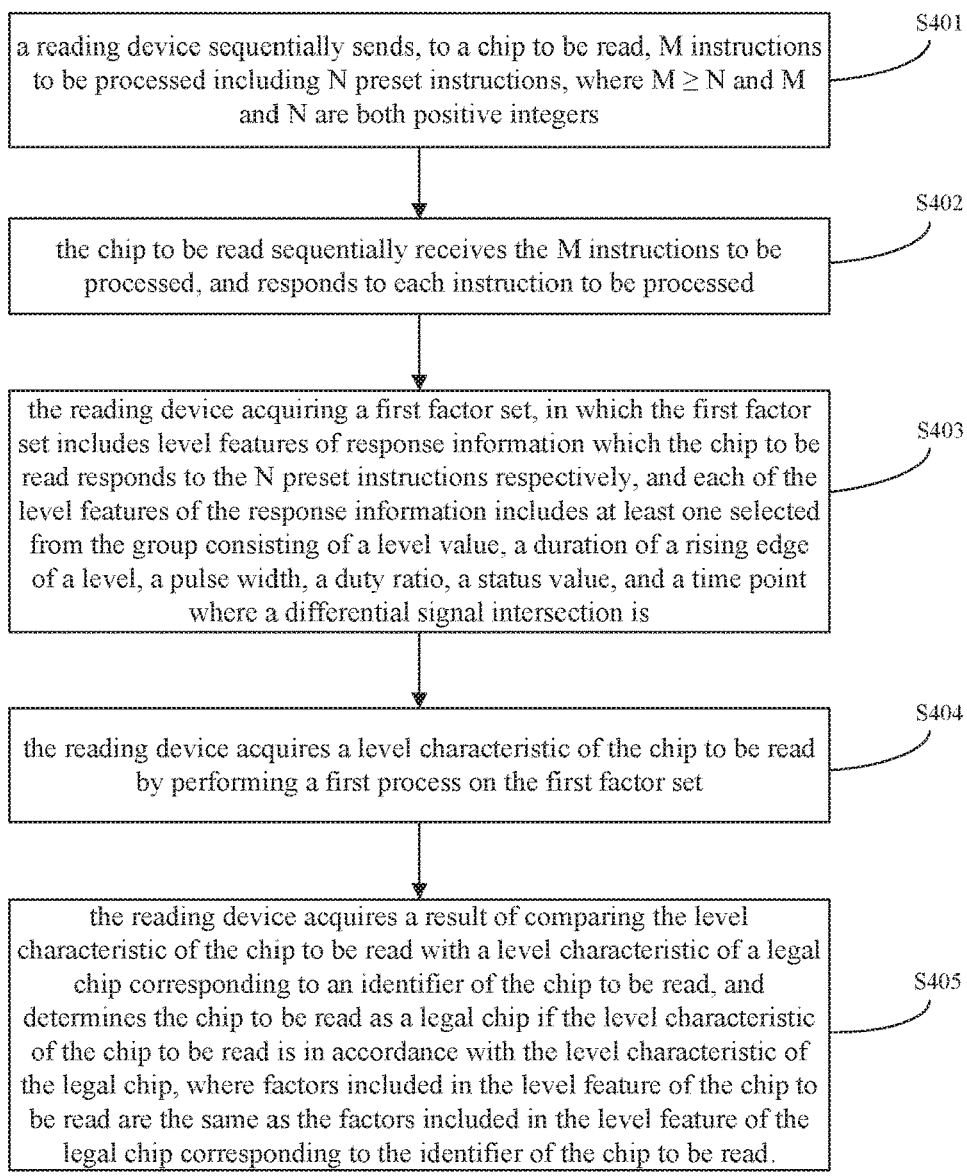
FIG. 5 is a flow chart of a legal chip identification method provided by Embodiment 3 of the present disclosure.

In this embodiment of the present disclosure, a legal chip identification method is provided FIG. 5 is a flow chart of a legal chip identification method provided in this embodiment. The method includes following steps (S401 to S405).

In S401, a reading device sequentially sends, to a chip to be read, M instructions to be processed including N preset instructions, where M≥N and M and N are both positive integers.

In this embodiment, the reading device may be any one of a POS machine, an ATM machine, a mobile phone with an NFC function, a bus card reader, a stored value card reader, a combination of a mobile phone and a card reader and a combination of a PC and a card reader. The chip to be read is disposed in a device to be read, and the device to be read may be any one of a second-generation resident ID card, a bus card, a smart card with a chip, a smart card with a chip and a magnetic strip and an electronic wallet. The device to be read is coupled to the reading device in a contact manner or a non-contact manner, where the contact manner may indicate that the device to be read is inserted into a preset slot of the reading device, and the non-contact manner may include, but is not limited to, NFC and Bluetooth.

In S401, when the device to be read accesses the reading device in a contact manner or a non-contact manner, the reading device sequentially sends M instructions to be processed to the chip to be read which is built in the device to be read. Alternatively, once one instruction to be processed is sent by the reading device, the reading device waits to receive response information which the chip to be read responds to this current instruction. The reading device will proceed and send a next instruction to be processed only after receiving the response information which the chip to be read responds to the current instruction to be processed. Alternatively, the reading device may wait to receive the response information which the chip to be read responses to the M instructions to be processed respectively after the M instructions to be processed are sequentially sent. Alternatively, the reading device may sequentially send the instructions to be processed to the chip to be read, and receive the response information which the chip to be read responds to the received instructions to be processed at the same time.

In S402, the chip to be read sequentially receives the M instructions to be processed, and responds to each instruction to be processed.

In S402, once the chip to be read receives one instruction to be processed, it responds to the received instruction to be processed, feeds the response information responded to the current instruction to be processed back to the reading device, and waits to receive a next instruction to be processed, which will be sent by the reading device. Alternatively, the chip to be read may start the operation of sequentially responding to the M instructions to be processed after the M instructions to be processed are sequentially received. Alternatively, the chip to be read may sequentially receive the M instructions to be processed which are sent by the reading device, and in the meantime respond to the received instructions to be processed and feed the response information back to the reading device to respond to the received instructions to be processed.

In S403, the reading device acquiring a first factor set, in which the first factor set includes level features of response information which the chip to be read responds to the N preset instructions respectively, and each of the level features of the response information includes at least one selected from the group consisting of a level value, a duration of a rising edge of a level, a pulse width, a duty ratio, a status value, and a time point where a differential signal intersection is.

In S403, the status value may be a status value of a communication interface, and the communication interface includes, but is not limited to, a USB interface, an NFC interface, an audio interface, and a Bluetooth interface, which are not specifically limited in this embodiment.

In S403, the reading device may acquire the first factor set after receiving response information which the chip to be read responds to the $N^{th}$ preset instruction or the $M^{th}$ instruction to be processed. Moreover, factors included in the level features of different response information may be the same or different.

In S404, the reading device acquires a level characteristic of the chip to be read by performing a first process on the first factor set.

In S404, the first process may be performed according to, but not limited to, any one of the following manners.

In a first manner, the reading device performs a calibrating process on level features of the response information, which the chip to be read responds to the preset instructions respectively, included in the first factor set, and uses calibrated level features as the level characteristic of the chip to be read. For example, in a calibration range available in a controllable scene, the reading device performs a calibrating process of rectifying a deviation on the level features of the response information, which the chip to be read responds to the preset instructions respectively, included in the first factor set.

In a second manner, the reading device stores level features of the response information, which the chip to be read responds to the preset instructions respectively, included in the first factor set, and uses the stored level feature as the level characteristic of the chip to be read.

In a third manner, the reading device performs a categorizing process on level features of the response information, which the chip to be read responds to the preset instructions respectively, included in the first factor set. For example, the preset instruction includes a card reading instruction a signature instruction and an encryption instruction. On this basis, level features of the response information which the chip to be read responds to the signature instruction and level features of the response information which the chip to be read responds to the encryption instruction are classified in one group and level features of the response information which the chip to be read responds to the card reading instruction are classified in another group.

Alternatively, the first process may also be a combination of any two or three of the foregoing three process manners, which is not specifically limited in this embodiment.

In S405, the reading device acquires a result of comparing the level characteristic of the chip to be read with a level characteristic of a legal chip corresponding to an identifier of the chip to be read, and determines the chip to be read as a legal chip if the level characteristic of the chip to be read is in accordance with the level characteristic of the legal chip.

In this embodiment, the identifier of the chip to be read may be unique identification information of the chip to be read, such as information of a serial number, a production number, a production date and the like.

Figure 6:
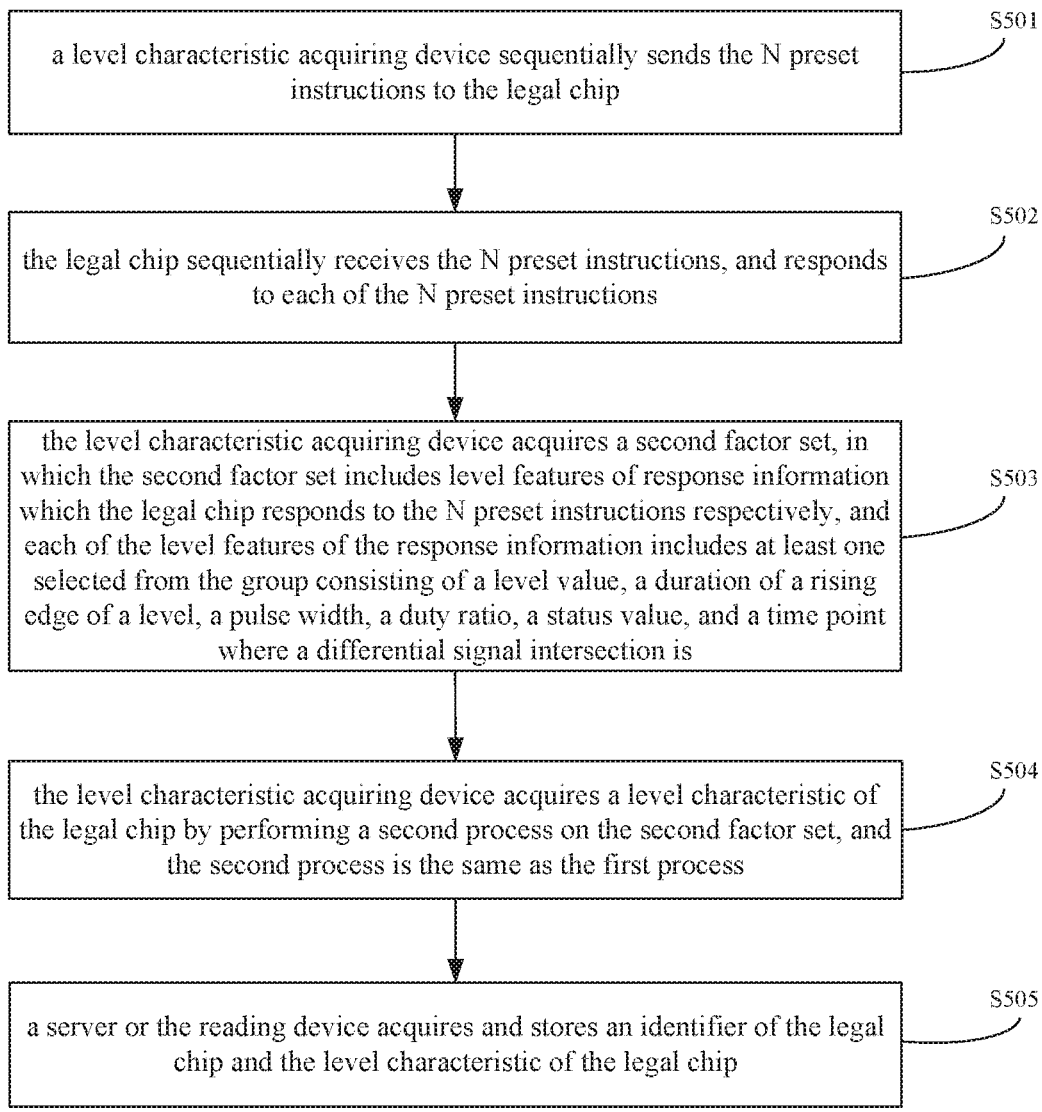
FIG. 6 is a flow chart of acquiring level characteristic of a legal chip in the legal chip identification method provided by Embodiment 3 of the present disclosure.

In an alternative embodiment of the present disclosure, before the reading device acquires the result of comparing the level characteristic of the chip to be read with the level characteristic of the legal chip corresponding to the identifier of the chip to be read, a level characteristic of the legal chip corresponding to the identifier of the chip to be read should be acquired, and thus as shown in FIG. 6, the method further includes following steps (S501 to S505).

In S501, a level characteristic acquiring device sequentially sends the N preset instructions to the legal chip.

In an alternative embodiment of the present disclosure, the level characteristic acquiring device may be the reading device, such that the reading device itself acquires the level characteristic of the legal chip corresponding to the identifier of the chip to be read. Alternatively, the level characteristic acquiring device may be an additional piece integrated with the reading device, for example an external member of a POS machine or a card reader and a protective containment of a mobile phone. In the process of the reading device determining whether the chip to be read is a legal chip, the level characteristic acquiring device can be used as a data transceiving module of the reading device, and the reading device sends an instruction to the chip to be read and receives the response information fed back from the chip to be read via the level characteristic acquiring device. Alternatively, the level characteristic acquiring device may be an external monitoring device independent of the reading device for monitoring the level characteristics of the legal chip.

In S501, when the device to be read with a built-in legal chip accesses the reading device in a contact manner or a non-contact manner, the level characteristic acquiring device sequentially sends N preset instructions to the legal chip built in the device to be read. Alternatively, once one preset instruction is sent by the level characteristic acquiring device, the level characteristic acquiring device waits to receive response information which the legal chip responds to this preset instruction. The level characteristic acquiring device will proceed and send a next preset instruction to the legal chip only after receiving the response information which the legal chip responds to the current preset instruction. Alternatively, the level characteristic acquiring device may wait to receive the response information which the legal chip responses to the N preset instructions respectively after the N preset instructions are sequentially sent. Alternatively, the level characteristic acquiring device may sequentially send the N preset instructions to the legal chip, and receive the response information which the legal chip responds to the received preset instructions at the same time.

In S501, the N preset instructions sent from the level characteristic acquiring device to the legal chip are the same as the N preset instructions sent from the reading device to the chip to be read.

In S502, the legal chip sequentially receives the N preset instructions, and responds to each of the N preset instructions.

In S502, once the legal chip receives one preset instruction, it responds to the received preset instruction, feeds the response information responded to the current preset instruction back to the level characteristic acquiring device, and waits to receive a next preset instruction, which will be sent by the level characteristic acquiring device. Alternatively, the legal chip may start the operation of sequentially responding to the N preset instructions after the N preset instructions are sequentially received. Alternatively, the legal chip may sequentially receive the N preset instructions which are sent by the level characteristic acquiring device, and in the meantime respond to the received preset instructions and feed the response information back to the level characteristic acquiring device to respond to the received preset instructions.

In S503, the level characteristic acquiring device acquires a second factor set, in which the second factor set includes level features of response information which the legal chip responds to the N preset instructions respectively, and each of the level features of the response information includes at least one selected from the group consisting of a level value, a duration of a rising edge of a level, a pulse width, a duty ratio, a status value, and a time point where a differential signal intersection is.

In S503, the status value may be a status value of a communication interface, and the communication interface includes, but is not limited to, a USB interface, an NFC interface, an audio interface, and a Bluetooth interface, which are not specifically limited in this embodiment.

In S504, the level characteristic acquiring device acquires a level characteristic of the legal chip by performing a second process on the second factor set, and the second process is the same as the first process.

In S504, the second process may be performed according to, but not limited to, any one of the following manners.

In a first manner, the level characteristic acquiring device performs a calibrating process on level features of the response information, which the legal chip responds to the preset instructions respectively, included in the second factor set, and uses calibrated level features as the level characteristic of the legal chip. For example, in a calibration range available in a controllable scene, the level characteristic acquiring device performs a calibrating process of rectifying a deviation on the level respectively, included in the second factor set.

In a second manner, the level characteristic acquiring device stores level features of the response information, which the legal chip responds to the preset instructions respectively, included in the second factor set and uses the stored level feature as the level characteristic of the legal chip.

In a third manner, the level characteristic acquiring device performs a categorizing process on level features of the response information, which the legal chip responds to the preset instructions respectively, included in the second factor set. For example, the preset instruction includes a card reading instruction, a signature instruction and an encryption instruction. On this basis, level features of the response information which the legal chip responds to the signature instruction and level features of the response information which the legal chip responds to the encryption instruction are classified in one group and level features of the response information which the legal chip responds to the card reading instruction are classified in another group.

Alternatively, the second process may also be a combination of any two or three of the foregoing three process manners, which is not specifically limited in this embodiment.

In S505, a server or the reading device acquires and stores an identifier of the legal chip and the level characteristic of the legal chip.

In S505, the server may be set in the background, and may communicate with the level characteristic acquiring device through a wired network or a wireless network. The wired network may be a private wire network or the internet, and the wireless network may be a 3G network, a 4G network or a WIFI network. When the level characteristic acquiring device is an external monitoring device independent of the reading device, the reading device may communicate with the level characteristic acquiring device through a wired network or a wireless network. Specifically, the wired network may be a private wire network or the internet, and the wireless network may be a 3G network, a 4G network or a WIFI network The above steps i.e., S501 to S505 may be performed during the legal chip factory test. Therefore, the level characteristic acquiring device pre-stores the level characteristic of the legal chip in the server or the reading device. When the legitimacy of the chip to be read needs to be identified, the level characteristic of the legal chip may be acquired directly from the server or the reading device.

In an alternative embodiment, the level characteristic acquiring device may acquire level characteristics of a plurality of legal chips. The server or the reading device may acquire the level characteristics of a plurality of legal chips from one level characteristic acquiring device or from a plurality of level characteristic acquiring devices, and store the identifier and the level characteristic of each of the legal chips.

In an alternative embodiment, in case the identifier and the level characteristic of the legal chip are not previously stored in the server or in the reading device, which may cause the comparison of the level characteristic of the chip to be read with the level characteristic of the legal chip corresponding to the identifier of the chip to be read cannot be performed, the server or the reading device may send an update request to the level characteristic acquiring device in a wired manner or in a wireless manner, and the level characteristic acquiring device responds to the update request. In such a way, the identifier and the level characteristic of the legal chip stored in the server or in the reading device may be updated, thus improving the accuracy of the comparison of the level characteristic of the chip to be read with the level characteristic of the legal chip corresponding to the identifier of the chip to be read.

In an alternative embodiment, if N=1 and the level feature of the response information includes m factors, where m≥1 and is a positive integer, in the process of determining whether the level characteristic of the chip to be read is in accordance with the level characteristic of the legal chip corresponding to the identifier of the chip to be read, it is necessary to compare the level feature factors of the chip to be read with the level feature factors of the legal chip, both responding to such a preset instruction, thereby acquiring m comparison results. If the number of accordance results in the m comparison results exceeds a first preset threshold it indicates that the level characteristic of the chip to be read is in accordance with the level characteristic of the legal chip corresponding to the identifier of the chip to be read, otherwise the level characteristic of the chip to be read is not in accordance with the level characteristic of the legal chip corresponding to the identifier of the chip to be read. For example, the preset instruction is instruction 1, and factors of the level feature of the response information which the chip to be read and the legal chip respond to instruction 1 include a level value, a pulse width and a duty ratio. In the process of determining whether the level characteristic of the chip to be read is in accordance with the level characteristic of the legal chip corresponding to the identifier of the chip to be read, a level value of the response information of the chip to be read responding to the instruction 1 is compared with a level value of the response information of the legal chip responding to the instruction 1, thereby acquiring a comparison result a1; a pulse width of the response information of the chip to be read responding to the instruction 1 is compared with a pulse width of the response information of the legal chip responding to the instruction 1, thereby acquiring a comparison result a2; and a duty ratio of the response information of the chip to be read responding to the instruction 1 is compared with a duty ratio of the response information of the legal chip responding to the instruction 1, thereby acquiring a comparison result a3. Specifically, the accordance result means that the level feature of the chip to be read is the same as the level feature of the legal chip or a difference between the two is in a certain error range. When the above three comparison results are all accordance results or more than half of the comparison results are accordance results, it is determined that the level characteristic of the chip to be read is in accordance with the level characteristic of the legal chip corresponding to the identifier of the chip to be read. Alternatively, only when the above three comparison results are all accordance results, it is determined that the level characteristic of the chip to be read is in accordance with the level characteristic of the legal chip corresponding to the identifier of the chip to be read.

In an alternative embodiment, if $N \geq 2$, in the process of determining whether the level characteristic of the chip to be read is in accordance with the level characteristic of the legal chip corresponding to the identifier of the chip to be read, it is necessary to compare the lever feature of the response information of the chip to be read with the level feature of the response information of the legal chip, both responding to the same preset instruction, thereby acquiring N comparison results. Specifically, the comparison process of comparing the level feature of the response information of the chip to be read with the level feature of the response information of the legal chip, both responding to the same preset instruction, may refer to the comparison process of the case where N=1. If the number of accordance results in the N comparison results exceeds a second preset threshold, it indicates that the level characteristic of the chip to be read is in accordance with the level characteristic of the legal chip corresponding to the identifier of the chip to be read, otherwise the level characteristic of the chip to be read is not in accordance with the level characteristic of the legal chip corresponding to the identifier of the chip to be read. For example, the preset instruction includes instruction 1, instruction 2 and instruction 3. In the process of determining whether the level characteristic of the chip to be read is in accordance with the level characteristic of the legal chip corresponding to the identifier of the chip to be read, a level feature of response information of the chip to be read responding to the instruction 1 is compared with a level feature of response information of the legal chip responding to the instruction 1, thereby acquiring a comparison result b1; a level feature of response information of the chip to be read responding to the instruction 2 is compared with a level feature of response information of the legal chip responding to the instruction 2, thereby acquiring a comparison result b2; and a level feature of response information of the chip to be read responding to the instruction 3 is compared with a level feature of response information of the legal chip responding to the instruction 3, thereby acquiring a comparison result b3. Specifically, the accordance result means that the level feature of the chip to be read is the same as the level feature of the legal chip or a difference between the two is in a certain error range. When the above three comparison results are all accordance results or more than half of the comparison results are accordance results, it is determined that the level characteristic of the chip to be read is in accordance with the level characteristic of the legal chip corresponding to the identifier of the chip to be read. Alternatively, only when the above three comparison results are all accordance results, it is determined that the level characteristic of the chip to be read is in accordance with the level characteristic of the legal chip corresponding to the identifier of the chip to be read.

In an alternative embodiment, the reading device acquires the result of comparing the level characteristic of the chip to be read with the level characteristic of the legal chip corresponding to the identifier of the chip to be read, and determines the chip to be read as a legal chip if the level characteristic of the chip to be read is in accordance with the level characteristic of the legal chip in any one of following three manners which shall not be construed to limit the present disclosure.

In a first manner, the reading device sends the identifier of the chip to be read and the level characteristic of the chip to be read to a server, the server receives the identifier of the chip to be read and the level characteristic of the chip to be read, acquires a pre-stored level characteristic of the legal chip corresponding to the identifier of the chip to be read, compares the level characteristic of the chip to be read with the level characteristic of the legal chip, and sends the result of the level characteristic of the chip to be read being in accordance with the level characteristic of the legal chip to the reading device; and the reading device determines that the chip to be read is a legal chip.

Alternatively, if the server compares the level characteristic of the chip to be read with the level characteristic of the legal chip and the level characteristic of the chip to be read is not in accordance with the level characteristic of the legal chip, the server may store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the level characteristic of the chip to be read and comparing the level characteristic of the chip to be read with the level characteristic of the legal chip corresponding to the identifier of the chip to be read, thus quickly identifying whether the chip to be read is legal.

In a second manner, the reading device acquires a pre-stored level characteristic of the legal chip corresponding to the identifier of the chip to be read, compares the level characteristic of the chip to be read with the level characteristic of the legal chip, and determines the chip to be read as a legal chip if the level characteristic of the chip to be read is in accordance with the level characteristic of the legal chip.

Alternatively, if the reading device compares the level characteristic of the chip to be read with the level characteristic of the legal chip and the level characteristic of the chip to be read is not in accordance with the level characteristic of the legal chip, the reading device may store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the level characteristic of the chip to be read and comparing the level characteristic of the chip to be read with the level characteristic of the legal chip corresponding to the identifier of the chip to be read, thus quickly identifying whether the chip to be read is legal.

In a third manner, the reading device sends the identifier of the chip to be read to a server, the server receives the identifier of the chip to be read, acquires a pre-stored level characteristic of the legal chip corresponding to the identifier of the chip to be read, and sends the level characteristic of the legal chip corresponding to the identifier of the chip to be read to the reading device; and the reading device compares the level characteristic of the chip to be read with the level characteristic of the legal chip, and determines the chip to be read as a legal chip if the level characteristic of the chip to be read is in accordance with the level characteristic of the legal chip.

Alternatively, if the reading device compares the level characteristic of the chip to be read with the level characteristic of the legal chip and the level characteristic of the chip to be read is not in accordance with the level characteristic of the legal chip, the reading device may inform the server to store the identifier of the chip to be read into a risk database. On this basis, when a subsequent reading device reads the device to be read with the chip to be read, it can be determined whether the chip to be read is a legal chip by querying the identifier of the chip to be read from the risk database of the server without steps of acquiring the level characteristic of the chip to be read and comparing the level characteristic of the chip to be read with the level characteristic of the legal chip corresponding to the identifier of the chip to be read, thus quickly identifying whether the chip to be read is legal.

In an alternative embodiment, the step of acquiring the pre-stored level characteristic of the legal chip corresponding to the identifier of the chip to be read includes: comparing the identifier of the chip to be read with the identifier of the legal chip; and acquiring the level characteristic of the legal chip if the identifier of the chip to be read is determined to be in accordance with the identifier of the legal chip.

Alternatively, if the device to be read with the built-in legal chip can access the reading device in a contact manner and a non-contact manner, for a same preset instruction sent by the reading device, a level feature of response information which the legal chip responds to such a preset instruction received in the contact manner may be the same as or different from a level feature of response information which the legal chip responds to the same preset instruction received in the non-contact manner. On this basis, in order to accurately identify whether the chip to be read is a legal chip, the device to be read with the built-in legal chip needs to access the level characteristic acquiring device in the contact manner and in the non-contact manner, respectively, and then the above steps i.e., S501 to S504, are performed for each manner, such that the level characteristic acquiring device may acquire the level characteristics of the legal chip in both the contact manner and the non-contact manner. Therefore, after determining that the level characteristic of the legal chip corresponding to the identifier of the chip to be read is in accordance, it is necessary to acquire the level characteristic of the legal chip corresponding to the identifier of the chip to be read according to a connection manner between the device to be read with the built-in chip and the reading device. In other words, if the connection manner between the reading device and the device to be read with the built-in chip to be read is the non-contact manner, the reading device acquires the level characteristic of the legal chip corresponding to the identifier of the chip to be read in the non-contact manner, and if the connection manner between the reading device and the device to be read with the built-in chip to be read is the contact manner, the reading device acquires the level characteristic of the legal chip corresponding to the identifier of the chip to be read in the contact manner.

In this embodiment, if the level characteristic of the chip to be read is not in accordance with the level characteristic of the legal chip corresponding to the identifier of the chip to be read, it indicates that the chip to be read is not a legal chip, and there will be a risk if a further operation is performed between the reading device and the chip to be read. Therefore, the reading device may generate prompt information and output the prompt information by means of voice broadcast, text display, light flashing, etc., for reminding the holder of reading device that the chip to be read is not a legal chip or there is a risk in the device to be read, or the reading device may send alarm information to the user of the device to be read with the built-in legal chip, for example, the reading device sends an alarm message, an alarm email and the like via a server to a mobile phone of the user of the device to be read with the built-in legal chip.

With the legal chip identification method according to embodiments of the present disclosure, on the basis of the fact that there may be difference in the level features which different chips respond to the instruction sent by the reading device, after the identifier of the chip to be read is acquired, the level characteristic of the chip to be read is compared with the level characteristic of the legal chip corresponding to the identifier of the chip to be read, and the chip to be read is determined as a legal chip if the level characteristic of the chip to be read is in accordance with the level characteristic of the legal chip. Therefore, even if a forged device to be read has a chip storing an identifier of a legal chip which is stolen and copied from the legal chip, it is possible to identify the legitimacy of the chip to be read according to the result of comparing the level characteristic of the chip to be read and the level characteristic of the legal chip having an identifier corresponding to the chip to be read, such that it may be effectively determined whether the device to be read with such a built-in chip to be read is legal, thus improving the accuracy of identifying the legitimacy of the device to be read by the reading device.

Embodiment 4

Figure 7:
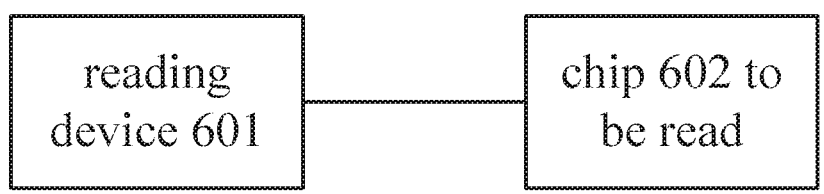
FIG. 7 is a schematic diagram of a legal chip identification system provided by Embodiment 4 of the present disclosure.

In this embodiment of the present disclosure, a legal chip identification system is provided and realized by the legal chip identification method provided in Embodiment 3. FIG. 7 is a schematic diagram of a legal chip identification system provided in this embodiment of the present disclosure. As shown in FIG. 7, the system includes a reading device 601 and a chip 602 to be read. Specifically, the reading device 601 is configured to sequentially send, to a chip 602 to be read, M instructions to be processed including N preset instructions, where M≥N and M and N are both positive integers; the chip 602 to be read is configured to sequentially receive the M instructions to be processed, and respond to each instruction to be processed; the reading device 601 is further configured to acquire a first factor set, in which the first factor set includes level features of response information which the chip 602 to be read responds to the N preset instructions respectively, and each of the level features of the response information includes at least one selected from the group consisting of a level value, a duration of a rising edge of a level, a pulse width, a duty ratio, a status value, and a time point where a differential signal intersection is; the reading device 601 is further configured to acquire a level characteristic of the chip 602 to be read by performing a first process on the first factor set; and the reading device 601 is further configured to acquire a result of comparing the level characteristic of the chip 602 to be read with a level characteristic of a legal chip 604 corresponding to an identifier of the chip to be read, and determine the chip 602 to be read as a legal chip 604 if the level characteristic of the chip 602 to be read is in accordance with the level characteristic of the legal chip 604.

In this embodiment, the reading device 601 may acquire the first factor set after receiving response information which the chip to be read responds to the $N^{th}$ preset instruction or the $M^{th}$ instruction to be processed. Moreover, factors included in the level features of different response information may be the same or different.

In this embodiment, the first process includes: categorizing, storing, and/or calibrating.

Figure 8:
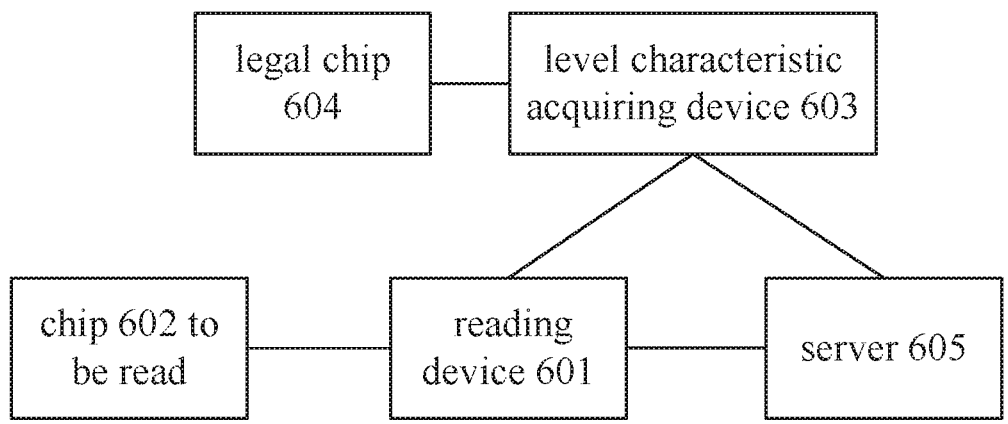
FIG. 8 is a schematic diagram of a legal chip identification system provided by Embodiment 4 of the present disclosure.

In an alternative embodiment of the present disclosure, as shown in FIG. 8, the system further includes a level characteristic acquiring device 603, a legal chip 604 and optionally a server 605. Specifically, before the reading device 601 acquires the result of comparing the level characteristic of the chip 602 to be read with the level characteristic of the legal chip 604 corresponding to the identifier of the chip 602 to be read, the level characteristic acquiring device 603 is configured to sequentially send the N preset instructions to the legal chip 604; the legal chip 604 is configured to sequentially receive the N preset instructions, and responding to each of the N preset instructions; the level characteristic acquiring device 603 is further configured to acquire a second factor set, in which the second factor set includes level features of response information which the legal chip 604 responds to the N preset instructions respectively, and each of the level features of the response information includes at least one selected from the group consisting of a level value, a duration of a rising edge of a level, a pulse width, a duty ratio, a status value, and a time point where a differential signal intersection is; the level characteristic acquiring device 603 is further configured to acquire a level characteristic of the legal chip 604 by performing a second process on the second factor set and the second process is the same as the first process; and the server 605 is configured to acquire and store the identifier of the legal chip 604 and the level characteristic of the legal chip 604, or the reading device 601 is further configured to acquire and store the identifier of the legal chip 604 and the level characteristic of the legal chip 604.

In an alternative embodiment, the N preset instructions sent from the level characteristic acquiring device 603 to the legal chip 604 are the same as the N preset instructions sent from the reading device 601 to the chip 602 to be read.

In this embodiment, the second process includes: categorizing, storing, and/or calibrating.

The level characteristic acquiring device 603 may perform the process of acquiring the level characteristic of the legal chip 604 during the factory test of the legal chip 604. Therefore, the level characteristic acquiring device 603 pre-stores the level characteristic of the legal chip 604 in the server 605 or the reading device 601. When the legitimacy of the chip 602 to be read needs to be identified, the level characteristic of the legal chip 604 may be acquired directly from the server 605 or the reading device 601.

In an alternative embodiment, if N=1 and the level feature of the response information includes m factors, where m≥1 and is a positive integer, in the process of determining whether the level characteristic of the chip 602 to be read is in accordance with the level characteristic of the legal chip 604 corresponding to the identifier of the chip 602 to be read, the level feature factors of the chip 602 to be read are compared with the level feature factors of the legal chip 604, both responding to such a preset instruction, thereby acquiring m comparison results. If the number of accordance results in the m comparison results exceeds a first preset threshold, it indicates that the level characteristic of the chip 602 to be read is in accordance with the level characteristic of the legal chip 604 corresponding to the identifier of the chip 602 to be read, otherwise the level characteristic of the chip 602 to be read is not in accordance with the level characteristic of the legal chip 604 corresponding to the identifier of the chip 602 to be read. For example, the preset instruction is instruction 1, and factors of the level feature of the response information which the chip 602 to be read and the legal chip 604 respond to instruction 1 include a level value, a pulse width and a duty ratio. In the process of determining whether the level characteristic of the chip 602 to be read is in accordance with the level characteristic of the legal chip 604 corresponding to the identifier of the chip to be read, a level value of the response information of the chip 602 to be read responding to the instruction 1 is compared with a level value of the response information of the legal chip 604 responding to the instruction 1, thereby acquiring a comparison result a1; a pulse width of the response information of the chip 602 to be read responding to the instruction 1 is compared with a pulse width of the response information of the legal chip 604 responding to the instruction 1, thereby acquiring a comparison result a2; and a duty ratio of the response information of the chip 602 to be read responding to the instruction 1 is compared with a duty ratio of the response information of the legal chip 604 responding to the instruction 1, thereby acquiring a comparison result a3. Specifically, the accordance result means that the level feature of the chip 602 to be read is the same as the level feature of the legal chip 604 or a difference between the two is in a certain error range. When the above three comparison results are all accordance results or more than half of the comparison results are accordance results, it is determined that the level characteristic of the chip 602 to be read is in accordance with the level characteristic of the legal chip 604 corresponding to the identifier of the chip to be read. Alternatively, only when the above three comparison results are all accordance results, it is determined that the level characteristic of the chip 602 to be read is in accordance with the level characteristic of the legal chip 604 corresponding to the identifier of the chip 602 to be read.

In an alternative embodiment, if N≥2, in the process of determining whether the level characteristic of the chip 602 to be read is in accordance with the level characteristic of the legal chip 604 corresponding to the identifier of the chip 602 to be read, the lever feature of the response information of the chip 602 to be read is compared with the level feature of the response information of the legal chip 604, both responding to the same preset instruction, thereby acquiring N comparison results. Specifically, the comparison process of comparing the level feature of the response information of the chip 602 to be read with the level feature of the response information of the legal chip 604, both responding to the same preset instruction, may refer to the comparison process of the case where N=1. If the number of accordance results in the N comparison results exceeds a second preset threshold, it indicates that the level characteristic of the chip 602 to be read is in accordance with the level characteristic of the legal chip 604 corresponding to the identifier of the chip 602 to be read, otherwise the level characteristic of the chip 602 to be read is not in accordance with the level characteristic of the legal chip 604 corresponding to the identifier of the chip 602 to be read. For example, the preset instruction includes instruction 1, instruction 2 and instruction 3. In the process of determining whether the level characteristic of the chip 602 to be read is in accordance with the level characteristic of the legal chip 604 corresponding to the identifier of the chip 602 to be read, a level feature of the response information of the chip 602 to be read responding to the instruction 1 is compared with a level feature of the response information of the legal chip 604 responding to the instruction 1, thereby acquiring a comparison result b1; a level feature of the response information of the chip 602 to be read responding to the instruction 2 is compared with a level feature of the response information of the legal chip 604 responding to the instruction 2, thereby acquiring a comparison result b2; and a level feature of the response information of the chip 602 to be read responding to the instruction 3 is compared with a level feature of the response information of the legal chip 604 responding to the instruction 3, thereby acquiring a comparison result b3. Specifically, the accordance result means that the level feature of the chip 602 to be read is the same as the level feature of the legal chip 604 or a difference between the two is in a certain error range. When the above three comparison results are all accordance results or more than half of the comparison results are accordance results, it is determined that the level characteristic of the chip 602 to be read is in accordance with the level characteristic of the legal chip 604 corresponding to the identifier of the chip 602 to be read. Alternatively, only when the above three comparison results are all accordance results, it is determined that the level characteristic of the chip 602 to be read is in accordance with the level characteristic of the legal chip 604 corresponding to the identifier of the chip 602 to be read.

In an alternative embodiment of the present disclosure, the reading device 601 acquires the result of comparing the level characteristic of the chip 602 to be read with the level characteristic of the legal chip 604 corresponding to the identifier of the chip 602 to be read, and determines the chip 600 to be read as a legal chip 604 if the level characteristic of the chip 602 to be read is in accordance with the level characteristic of the legal chip 604 in any one of following manners.

In a first manner, as shown in FIG. 1, the reading device 601 is further configured to send the identifier of the chip 602 to be read and the level characteristic of the chip 602 to be read to a server 605; the server 605 is further configured to receive the identifier of the chip 602 to be read and the level characteristic of the chip 602 to be read, acquire a pre-stored level characteristic of the legal chip 604 corresponding to the identifier of the chip 602 to be read, compare the level characteristic of the chip 602 to be read with the level characteristic of the legal chip 604, and send a result of the level characteristic of the chip 602 to be read being in accordance with the level characteristic of the legal chip 604 to the reading device 601; and the reading device 601 is further configured to determine that the chip 602 to be read is a legal chip 604.

In a second manner, the reading device 601 is further configured to acquire a pre-stored level characteristic of the legal chip 604 corresponding to the identifier of the chip 602 to be read, compare the level characteristic of the chip 602 to be read with the level characteristic of the legal chip 604, and determine the chip 602 to be read as a legal chip 604 if the level characteristic of the chip 602 to be read is in accordance with the level characteristic of the legal chip 604.

In a third manner, as shown in FIG. 8, the reading device 601 is further configured to send the identifier of the chip 602 to be read to a server 605; the server 605 is further configured to receive the identifier of the chip 602 to be read, acquire a pre-stored level characteristic of the legal chip 604 corresponding to the identifier of the chip 602 to be read, and send the level characteristic of the legal chip 604 corresponding to the identifier of the chip 602 to be read to the reading device 601; and the reading device 601 is further configured to compare the level characteristic of the chip 602 to be read with the level characteristic of the legal chip 604, and determine the chip 602 to be read as a legal chip 604 if the level characteristic of the chip 602 to be read is in accordance with the level characteristic of the legal chip 604.

In an alternative embodiment, the server 605 or the reading device 601 acquires the pre-stored level characteristic of the legal chip 604 corresponding to the identifier of the chip 602 to be read in a following manner: comparing the identifier of the chip 602 to be read with the identifier of the legal chip 604; and acquiring the level characteristic of the legal chip 604 if the identifier of the chip 602 to be read is determined to be in accordance with the identifier of the legal chip 604.

In this embodiment, if the level characteristic of the chip 602 to be read is not in accordance with the level characteristic of the legal chip 604 corresponding to the identifier of the chip 602 to be read, it indicates that the chip 602 to be read is not a legal chip 604, and there will be a risk if a further operation is performed between the reading device 601 and the chip 602 to be read. Therefore, the reading device 601 may generate prompt information and output the prompt information by means of voice broadcast, text display, light flashing, etc., for reminding the holder of reading device 601 that the chip 602 to be read is not a legal chip 604 or there is a risk in the device to be read, or the reading device 601 may send alarm information to the user of the device to be read with the built-in legal chip 604, for example, the reading device 601 sends an alarm message, an alarm email and the like via a server 605 to a mobile phone of the user of the device to be read with the built-in legal chip 604.

With the legal chip identification system according to embodiments of the present disclosure, on the basis of the fact that there may be difference in the level features which different chips respond to the instruction sent by the reading device 601, after the identifier of the chip 602 to be read is acquired, the level characteristic of the chip 602 to be read is compared with the level characteristic of the legal chip 604 corresponding to the identifier of the chip 602 to be read, and the chip 602 to be read is determined as a legal chip 604 if the level characteristic of the chip 602 to be read is in accordance with the level characteristic of the legal chip 604. Therefore, even if a forged device to be read has a chip storing an identifier of a legal chip which is stolen and copied from the legal chip 604, it is possible to identify the legitimacy of the chip 602 to be read according to the result of comparing the level characteristic of the chip 602 to be read and the level characteristic of the legal chip 604 having an identifier corresponding to the chip 602 to be read, such that it may be effectively determined whether the device to be read with such a built-in chip 602 to be read is legal, thus improving the accuracy of identifying the legitimacy of the device to be read by the reading device 601.

Although explanatory embodiments have been shown and described, it would be appreciated by those skilled in the art that the above embodiments cannot be construed to limit the present disclosure, and changes, alternatives, and modifications can be made in the embodiments without departing from spirit principles and scope of the present disclosure.

What is claimed is:

1. A method for identifying a legal chip, comprising:
a reading device sequentially sending, to a chip to be read, M instructions to be processed comprising N preset instructions, where M≥N and M and N are both positive integers;
the chip to be read sequentially receiving the M instructions to be processed, and responding to each instruction to be processed;
the reading device acquiring a set of first processing durations in which the chip to be read responds to the N preset instructions, respectively;
the reading device acquiring a processing duration characteristic of the chip to be read by performing a first process on the set of first processing durations; and
the reading device acquiring a result of comparing the processing duration characteristic of the chip to be read with a processing duration characteristic of a legal chip corresponding to an identifier of the chip to be read, and determining the chip to be read as a legal chip if the processing duration characteristic of the chip to be read is in accordance with the processing duration characteristic of the legal chip.

2. The method according to claim 1, wherein before the reading device acquires the result of comparing the processing duration characteristic of the chip to be read with the processing duration characteristic of the legal chip corresponding to the identifier of the chip to be read, the method further comprises:
a processing duration characteristic acquiring device sequentially sending the N preset instructions to the legal chip;
the legal chip sequentially receiving the N preset instructions, and responding to each of the N preset instructions;
the processing duration characteristic acquiring device acquiring a set of second processing durations in which the legal chip responds to the N preset instructions, respectively;
the processing duration characteristic acquiring device acquiring the processing duration characteristic of the legal chip by performing a second process on the set of second processing durations, in which the second process is the same as the first process; and
a server or the reading device acquiring and storing an identifier of the legal chip and the processing duration characteristic of the legal chip.

3. The method according to claim 1, wherein the reading device acquiring the result of comparing the processing duration characteristic of the chip to be read with the processing duration characteristic of a legal chip corresponding to an identifier of the chip to be read, and determining the chip to be read as a legal chip if the processing duration characteristic of the chip to be read is in accordance with the processing duration characteristic of the legal chip comprises: the reading device sending the identifier of the chip to be read and the processing duration characteristic of the chip to be read to a server;
the server receiving the identifier of the chip to be read and the processing duration characteristic of the chip to be read, acquiring a pre-stored processing duration characteristic of the legal chip corresponding to the identifier of the chip to be read, comparing the processing duration characteristic of the chip to be read with the processing duration characteristic of the legal chip, and sending the result of the processing duration characteristic of the chip to be read being in accordance with the processing duration characteristic of the legal chip to the reading device; and
the reading device determining that the chip to be read is a legal chip;
or
the reading device acquiring a pre-stored processing duration characteristic of the legal chip corresponding to the identifier of the chip to be read, comparing the processing duration characteristic of the chip to be read with the processing duration characteristic of the legal chip, and determining the chip to be read as a legal chip if the processing duration characteristic of the chip to be read is in accordance with the processing duration characteristic of the legal chip;
or
the reading device sending the identifier of the chip to be read to a server;
the server receiving the identifier of the chip to be read, acquiring a pre-stored processing duration characteristic of the legal chip corresponding to the identifier of the chip to be read, and sending the processing duration characteristic of the legal chip corresponding to the identifier of the chip to be read to the reading device; and
the reading device comparing the processing duration characteristic of the chip to be read with the processing duration characteristic of the legal chip, and determining the chip to be read as a legal chip if the processing duration characteristic of the chip to be read is in accordance with the processing duration characteristic of the legal chip.

4. The method according to claim 3, wherein acquiring a pre-stored processing duration characteristic of the legal chip corresponding to the identifier of the chip to be read comprises:
comparing the identifier of the chip to be read with the identifier of the legal chip; and
acquiring the processing duration characteristic of the legal chip if the identifier of the chip to be read is determined to be in accordance with the identifier of the legal chip.

5. The method according to claim 1, wherein the first process comprises: categorizing, storing, and/or calibrating.

6. A system for identifying a legal chip, comprising a reading device and a chip to be read, wherein the reading device is configured to sequentially send, to the chip to be read, M instructions to be processed comprising N preset instructions, where M≥N and M and N are both positive integers;

the chip to be read is configured to sequentially receive the M instructions to be processed, and respond to each instruction to be processed;

the reading device is further configured to acquire a set of first processing durations in which the chip to be read responds to the N preset instructions, respectively;

the reading device is further configured to acquire a processing duration characteristic of the chip to be read by performing a first process on the set of first processing durations; and the reading device is further configured to acquire a result of comparing the processing duration characteristic of the chip to be read with a processing duration characteristic of a legal chip corresponding to an identifier of the chip to be read, and determine that the chip to be read is a legal chip if the processing duration characteristic of the chip to be read is in accordance with the processing duration characteristic of the legal chip.

7. The system according to claim 6, further comprising a processing duration characteristic acquiring device, a legal chip and optionally a server, wherein before the reading device acquires the result of comparing the processing duration characteristic of the chip to be read with the processing duration characteristic of the legal chip corresponding to an identifier of the chip to be read, the processing duration characteristic acquiring device is configured to sequentially send the N preset instructions to the legal chip;

the legal chip is configured to sequentially receive the N preset instructions, and respond to each of the N preset instructions;

the processing duration characteristic acquiring device is further configured to acquire a set of second processing durations in which the legal chip responds to the N preset instructions, respectively;

the processing duration characteristic acquiring device is further configured to acquire the processing duration characteristic of the legal chip by performing a second process on the set of second processing durations, in which the second process is the same as the first process; and the server is configured to acquire and store an identifier of the legal chip and the processing duration characteristic of the legal chip, or the reading device is further configured to acquire and store an identifier of the legal chip and the processing duration characteristic of the legal chip.

8. The system according to claim 6, wherein the reading device acquires the result of comparing the processing duration characteristic of the chip to be read with the processing duration characteristic of the legal chip corresponding to the identifier of the chip to be read, and determines that the chip to be read is a legal chip if the processing duration characteristic of the chip to be read is in accordance with the processing duration characteristic of the legal chip in any one of following manners:

the reading device is further configured to send the identifier of the chip to be read and the processing duration characteristic of the chip to be read to a server;

the server is further configured to receive the identifier of the chip to be read and the processing duration characteristic of the chip to be read, acquire a pre-stored processing duration characteristic of the legal chip corresponding to the identifier of the chip to be read, compare the processing duration characteristic of the chip to be read with the processing duration characteristic of the legal chip, and send the result of the processing duration characteristic of the chip to be read being in accordance with the processing duration characteristic of the legal chip to the reading device; and the reading device is further configured to determine that the chip to be read is a legal chip;

or the reading device is further configured to acquire a pre-stored processing duration characteristic of the legal chip corresponding to the identifier of the chip to be read, and compare the processing duration characteristic of the chip to be read with the processing duration characteristic of the legal chip, and determine that the chip to be read is a legal chip if the processing duration characteristic of the chip to be read is in accordance with the processing duration characteristic of the legal chip;

or the reading device is further configured to send the identifier of the chip to be read to a server;

the server is further configured to receive the identifier of the chip to be read, acquire a pre-stored processing duration characteristic of the legal chip corresponding to the identifier of the chip to be read, and send the processing duration characteristic of the legal chip corresponding to the identifier of the chip to be read to the reading device; and the reading device is further configured to compare the processing duration characteristic of the chip to be read with the processing duration characteristic of the legal chip, and determine that the chip to be read is a legal chip if the processing duration characteristic of the chip to be read is in accordance with the processing duration characteristic of the legal chip.

9. The system according to claim 8, wherein the reading device or the server acquires the pre-stored processing duration characteristic of the legal chip corresponding to the identifier of the chip to be read in a following manner:

comparing the identifier of the chip to be read with the identifier of the legal chip;

acquiring the processing duration characteristic of the legal chip if the identifier of the chip to be read is determined to be in accordance with the identifier of the legal chip.

10. The system according to any one of claim 6, wherein the first process comprises: categorizing, storing, and/or calibrating.

11. A method for identifying a legal chip, comprising:

a reading device sequentially sending, to a chip to be read, M instructions to be processed comprising N preset instructions, where M≥N and M and N are both positive integers;

the chip to be read sequentially receiving the M instructions to be processed, and responding to each instruction to be processed;

the reading device acquiring a first factor set, wherein the first factor set comprises level features of response information which the chip to be read responds to the N preset instructions respectively, and each of the level features of the response information comprises at least one selected from the group consisting of a level value, a duration of a rising edge of a level, a pulse width, a duty ratio, a status value, and a time point where a differential signal intersection is;

the reading device acquiring a level characteristic of the chip to be read by performing a first process on the first factor set; and the reading device acquiring a result of comparing the level characteristic of the chip to be read with a level characteristic of a legal chip corresponding to an identifier of the chip to be read, and determining the chip to be read as a legal chip if the level characteristic of the chip to be read is in accordance with the level characteristic of the legal chip.

12. The method according to claim 11, wherein before the reading device acquires the result of comparing the level characteristic of the chip to be read with the level characteristic of the legal chip corresponding to the identifier of the chip to be read, the method further comprises:

a level characteristic acquiring device sequentially sending the N preset instructions to the legal chip;

the legal chip sequentially receiving the N preset instructions, and responding to each of the N preset instructions;

the level characteristic acquiring device acquiring a second factor set, wherein the second factor set comprises level features of response information which the legal chip responds to the N preset instructions respectively, and each of the level features of the response information comprises at least one selected from the group consisting of a level value, a duration of a rising edge of a level, a pulse width, a duty ratio, a status value, and a time point where a differential signal intersection is;

the level characteristic acquiring device acquiring the level characteristic of the legal chip by performing a second process on the second factor set, in which the second process is the same as the first process; and a server or the reading device acquiring and storing an identifier of the legal chip and the level characteristic of the legal chip.

13. The method according to claim 11, wherein the reading device acquiring the result of comparing the level characteristic of the chip to be read with the level characteristic of the legal chip corresponding to the identifier of the chip to be read, and determining the chip to be read as a legal chip if the level characteristic of the chip to be read is in accordance with the level characteristic of the legal chip comprises:

the reading device sending the identifier of the chip to be read and the level characteristic of the chip to be read to a server;

the server receiving the identifier of the chip to be read and the level characteristic of the chip to be read, acquiring a pre-stored level characteristic of the legal chip corresponding to the identifier of the chip to be read, comparing the level characteristic of the chip to be read with the level characteristic of the legal chip, and sending a result of the level characteristic of the chip to be read being in accordance with the level characteristic of the legal chip to the reading device; and the reading device determining that the chip to be read is a legal chip;

or the reading device acquiring a pre-stored level characteristic of the legal chip corresponding to the identifier of the chip to be read, comparing the level characteristic of the chip to be read with the level characteristic of the legal chip, and determining the chip to be read as a legal chip if the level characteristic of the chip to be read is in accordance with the level characteristic of the legal chip;

or the reading device sending the identifier of the chip to be read to a server;

the server receiving the identifier of the chip to be read, acquiring a pre-stored level characteristic of the legal chip corresponding to the identifier of the chip to be read, and sending the level characteristic of the legal chip corresponding to the identifier of the chip to be read to the reading device; and the reading device comparing the level characteristic of the chip to be read with the level characteristic of the legal chip, and determining the chip to be read as a legal chip if the level characteristic of the chip to be read is in accordance with the level characteristic of the legal chip.

14. The method according to claim 13, wherein acquiring a pre-stored level characteristic of the legal chip corresponding to the identifier of the chip to be read comprises:

comparing the identifier of the chip to be read with the identifier of the legal chip; and acquiring the level characteristic of the legal chip if the identifier of the chip to be read is determined to be in accordance with the identifier of the legal chip.

15. The method according to claim 11, wherein the first process comprises: categorizing, storing, and/or calibrating.

16. The method according to claim 2, wherein the reading device acquiring the result of comparing the processing duration characteristic of the chip to be read with the processing duration characteristic of a legal chip corresponding to an identifier of the chip to be read, and determining the chip to be read as a legal chip if the processing duration characteristic of the chip to be read is in accordance with the processing duration characteristic of the legal chip comprises:

the reading device sending the identifier of the chip to be read and the processing duration characteristic of the chip to be read to a server;

the server receiving the identifier of the chip to be read and the processing duration characteristic of the chip to be read, acquiring a pre-stored processing duration characteristic of the legal chip corresponding to the identifier of the chip to be read, comparing the processing duration characteristic of the chip to be read with the processing duration characteristic of the legal chip, and sending the result of the processing duration characteristic of the chip to be read being in accordance with the processing duration characteristic of the legal chip to the reading device; and the reading device determining that the chip to be read is a legal chip;

or the reading device acquiring a pre-stored processing duration characteristic of the legal chip corresponding to the identifier of the chip to be read, comparing the processing duration characteristic of the chip to be read with the processing duration characteristic of the legal chip, and determining the chip to be read as a legal chip if the processing duration characteristic of the chip to be read is in accordance with the processing duration characteristic of the legal chip;

or the reading device sending the identifier of the chip to be read to a server;

the server receiving the identifier of the chip to be read, acquiring a pre-stored processing duration characteristic of the legal chip corresponding to the identifier of the chip to be read, and sending the processing duration characteristic of the legal chip corresponding to the identifier of the chip to be read to the reading device; and the reading device comparing the processing duration characteristic of the chip to be read with the processing duration characteristic of the legal chip, and determining the chip to be read as a legal chip if the processing duration characteristic of the chip to be read is in accordance with the processing duration characteristic of the legal chip.

17. The method according to claim 2, wherein the first process comprises: categorizing, storing, and/or calibrating.

18. The method according to claim 2, wherein the second process comprises: categorizing, storing, and/or calibrating.

19. The method according to claim 3, wherein the first process comprises: categorizing, storing, and/or calibrating.

20. The method according to claim 4, wherein the first process comprises: categorizing, storing, and/or calibrating.

* * * * *